May 3, 1927.

B. M. SHIPLEY 1,626,880

CASH REGISTER

Original Filed Jan. 12, 1920    15 Sheets-Sheet 1

Inventor
BERNIS M. SHIPLEY
by Hearl Beust
Henry E. Stauffer
Attorneys

May 3, 1927.  1,626,880
B. M. SHIPLEY
CASH REGISTER
Original Filed Jan. 12, 1920   15 Sheets-Sheet 2
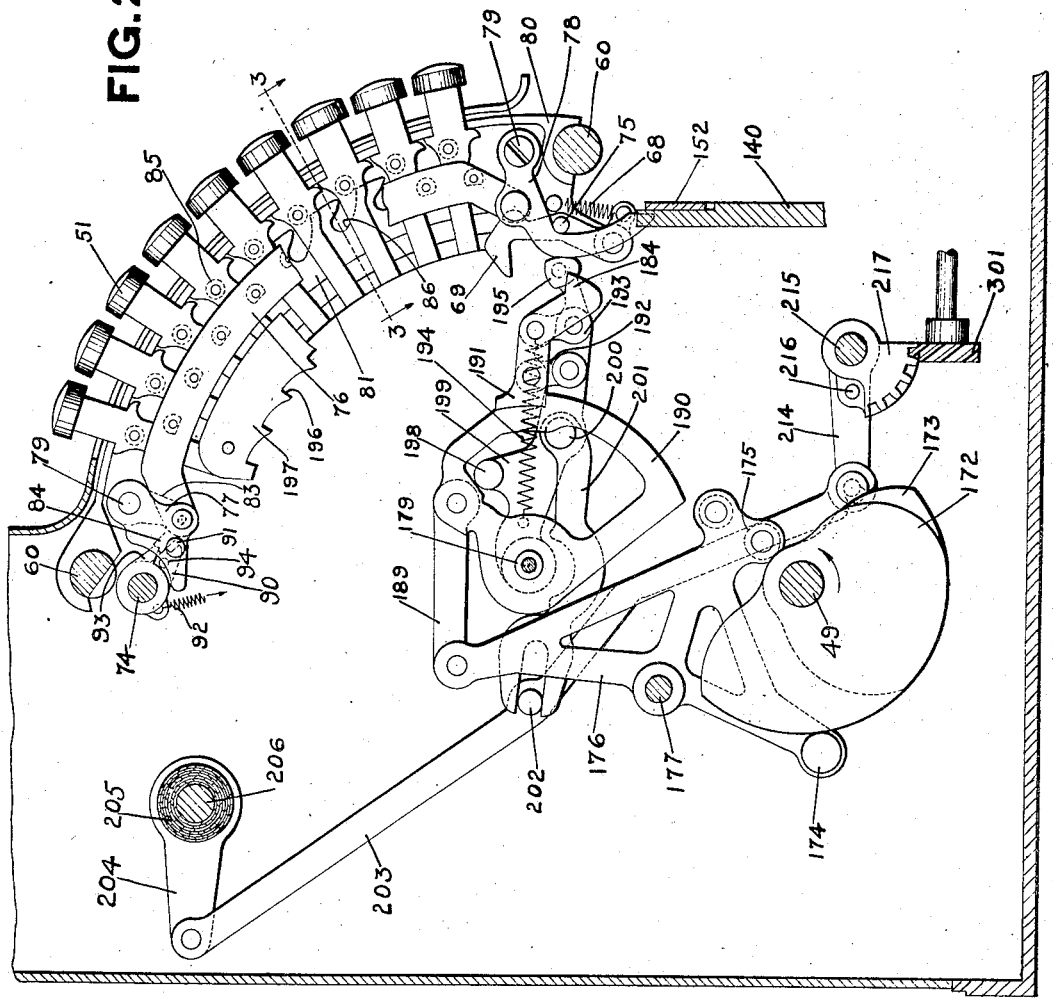
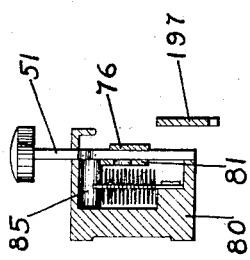
Inventor
BERNIS M. SHIPLEY May 3, 1927. 1,626,880
B. M. SHIPLEY
CASH REGISTER
Original Filed Jan. 12, 1920   15 Sheets-Sheet 3
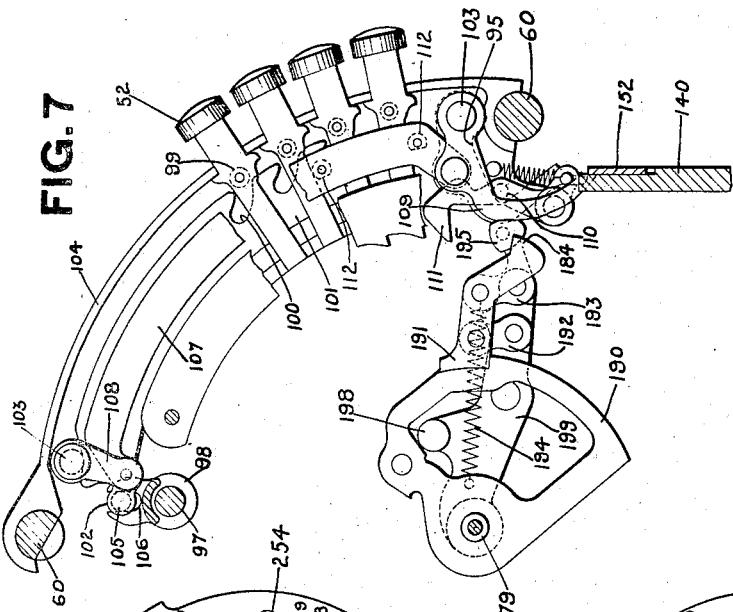
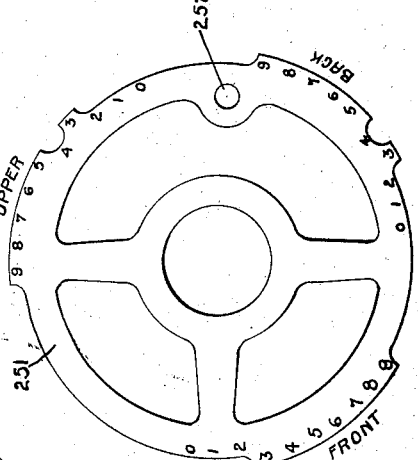
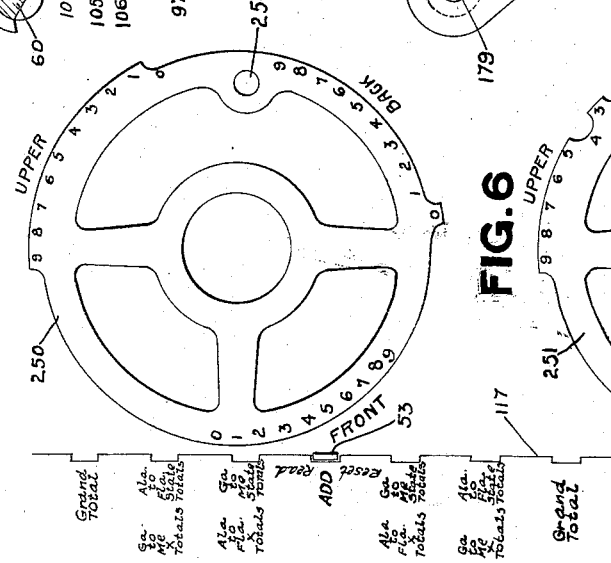
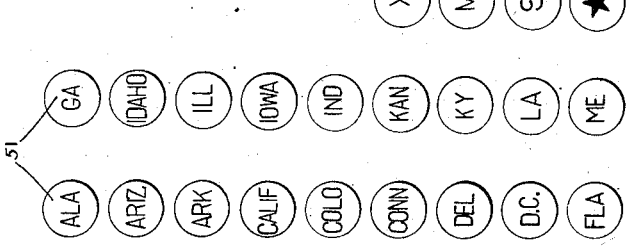
Inventor
BERNIS M. SHIPLEY
Attorneys May 3, 1927.  1,626,880

B. M. SHIPLEY

CASH REGISTER

Original Filed Jan. 12, 1920   15 Sheets-Sheet 4

Inventor
BERNIS M. SHIPLEY
by Earl Bennett
Henry E. Stauffer
Attorneys

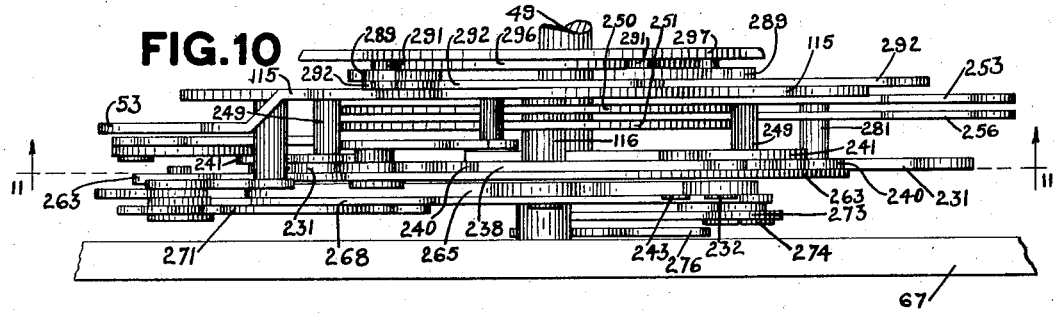

May 3, 1927.
B. M. SHIPLEY
1,626,880
CASH REGISTER
Original Filed Jan. 12, 1920   15 Sheets-Sheet 6
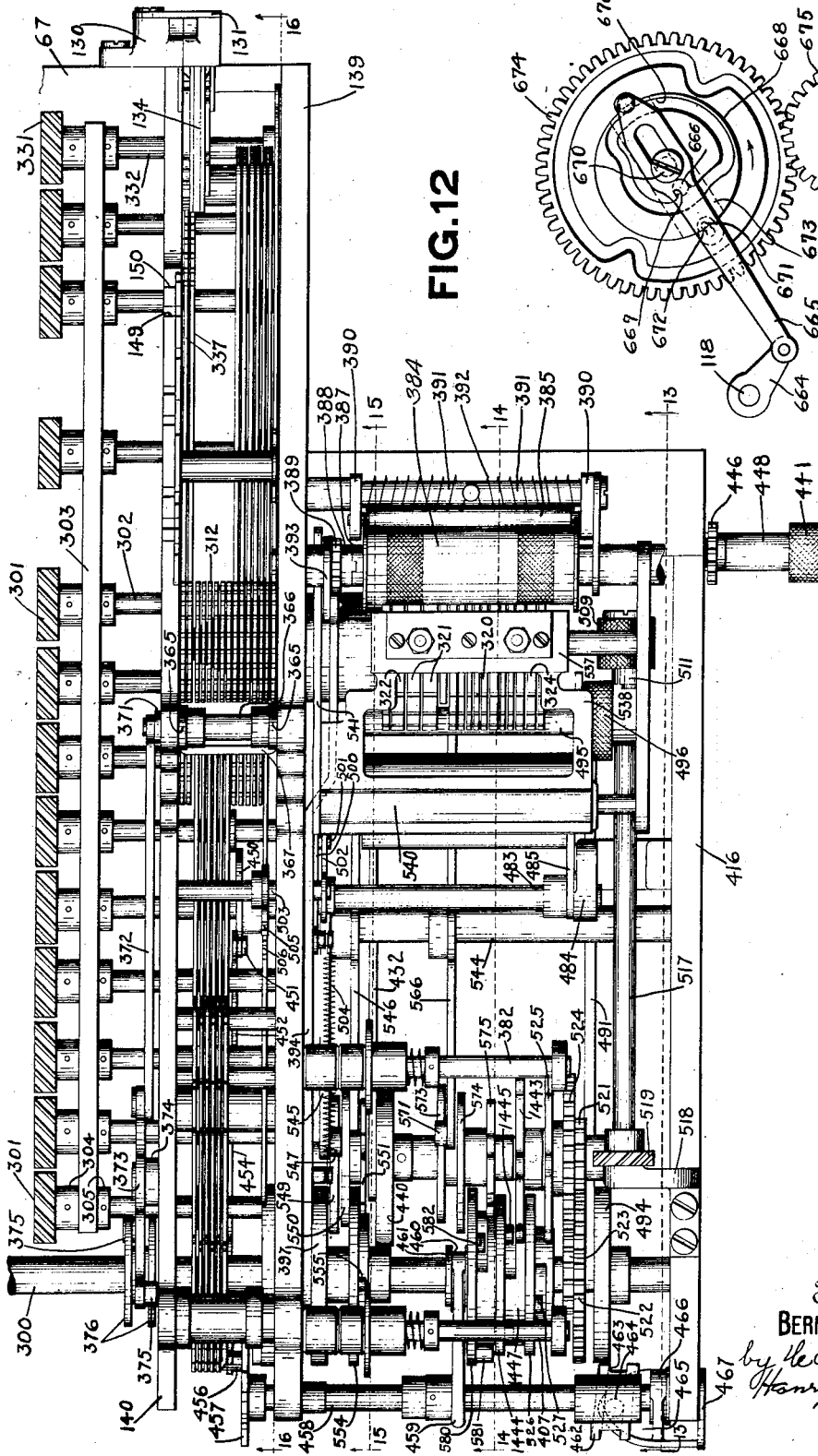
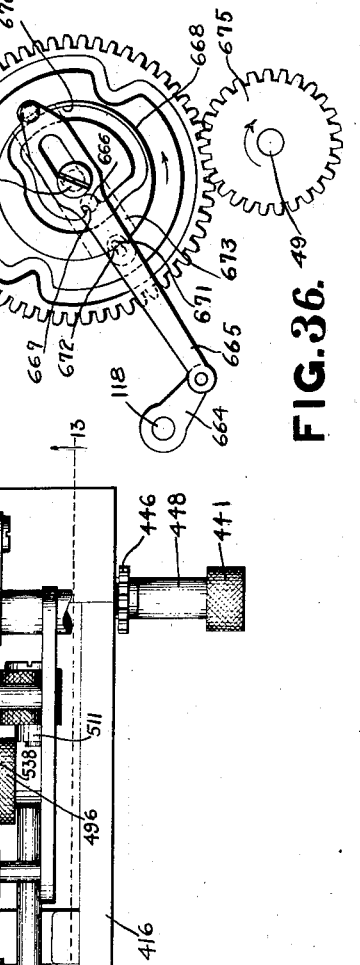
Inventor
BERNIS M. SHIPLEY
by Earl Beust
Henry E Stauffer
Attorneys

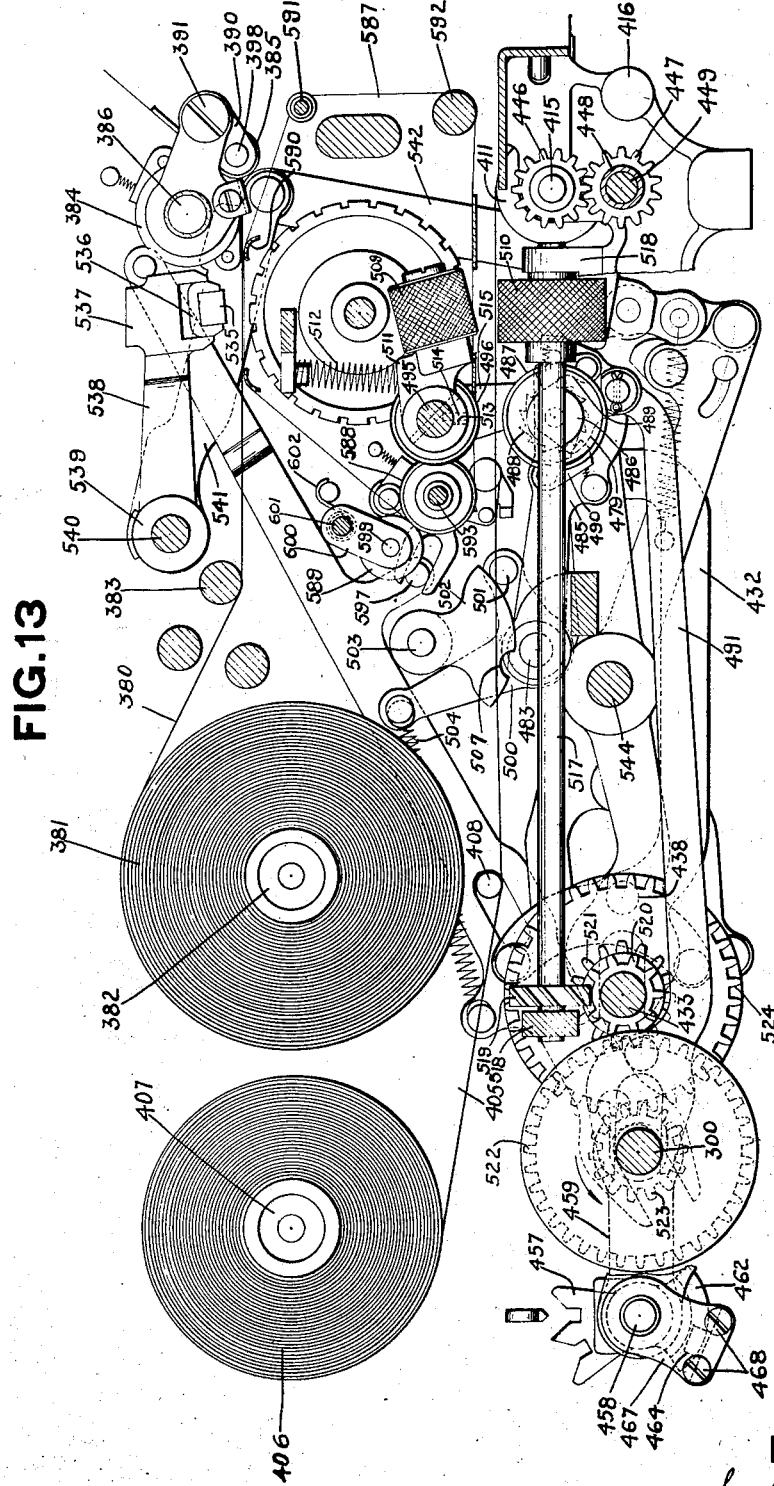

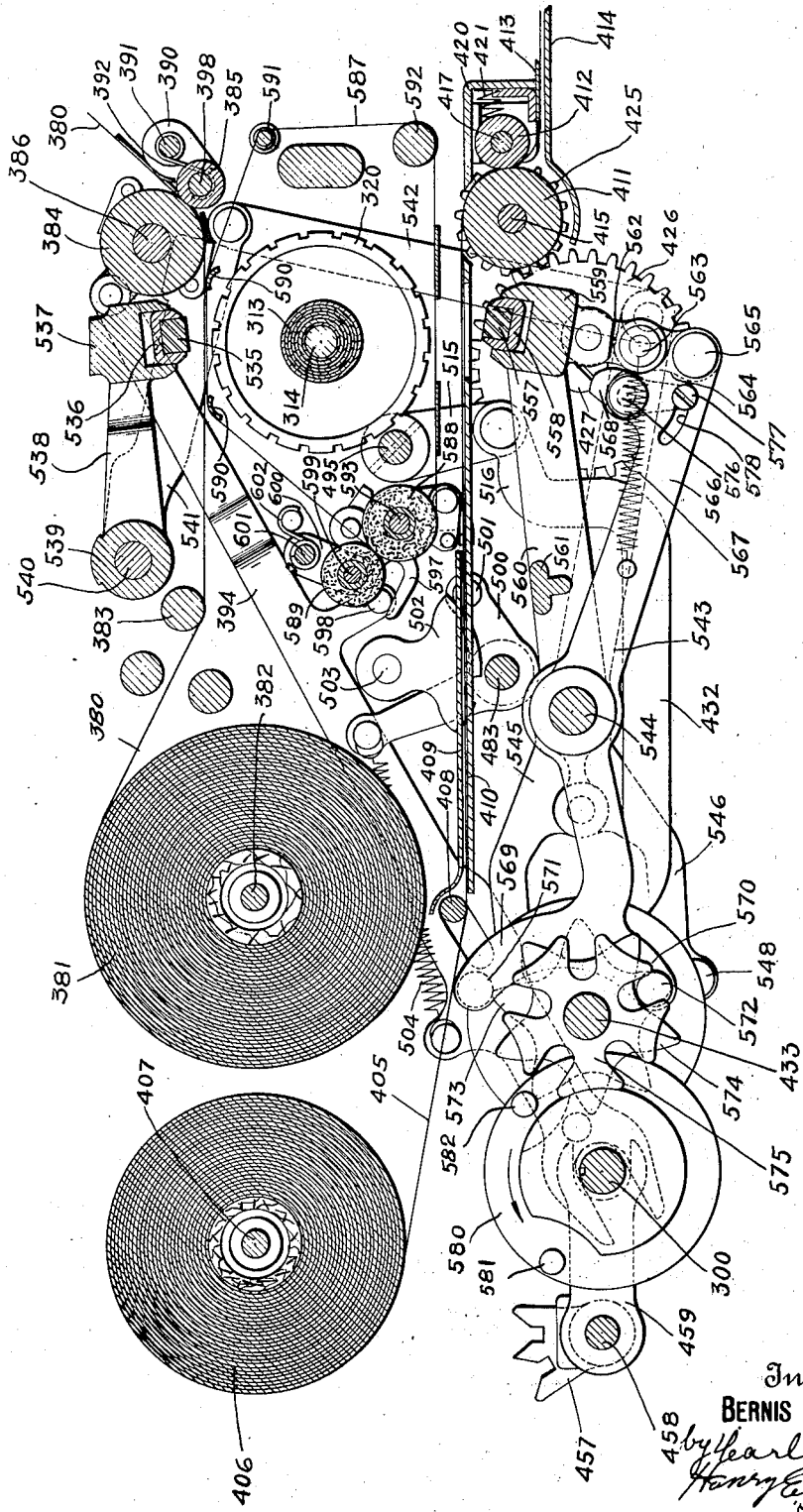

May 3, 1927.

B. M. SHIPLEY 1,626,880

CASH REGISTER

Original Filed Jan. 12, 1920

Inventor
BERNIS M. SHIPLEY
by Carl Beust
Henry E. Stauffer
Attorneys

May 3, 1927.
B. M. SHIPLEY
1,626,880
CASH REGISTER
Original Filed Jan. 12, 1920   15 Sheets-Sheet 10
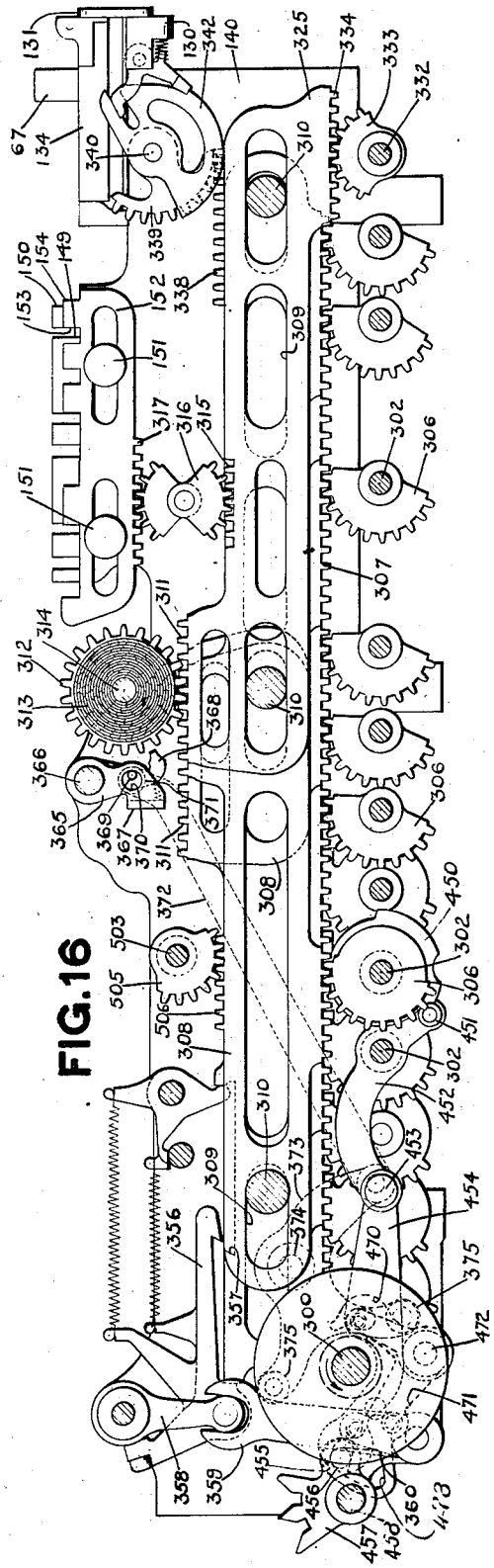
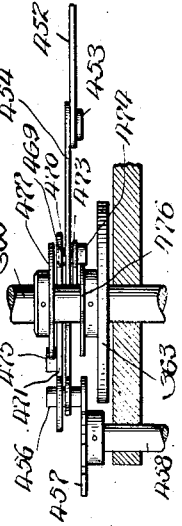
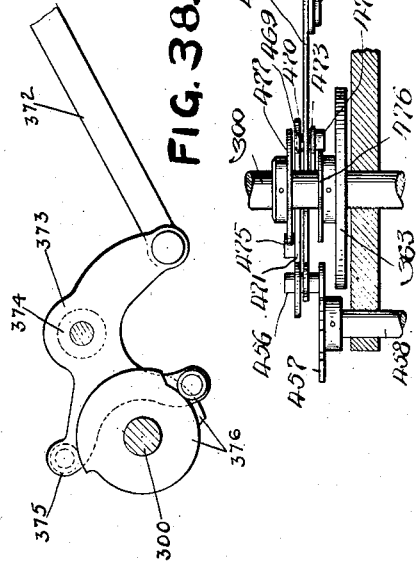
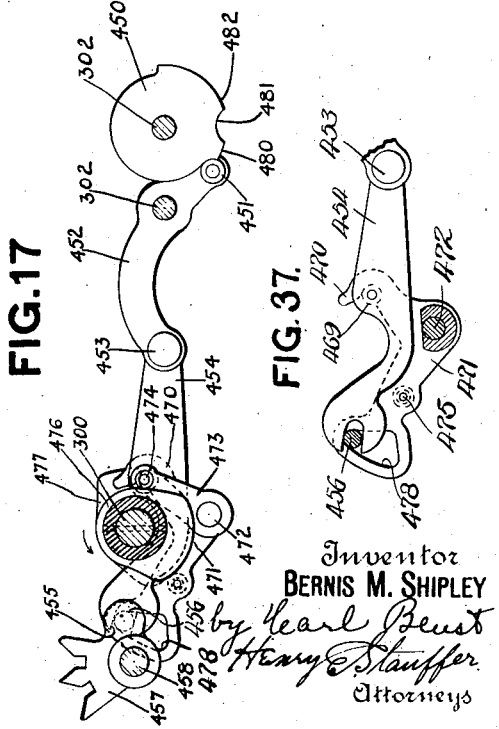
Inventor
BERNIS M. SHIPLEY
by Earl Beust
Henry Stauffer
Attorneys

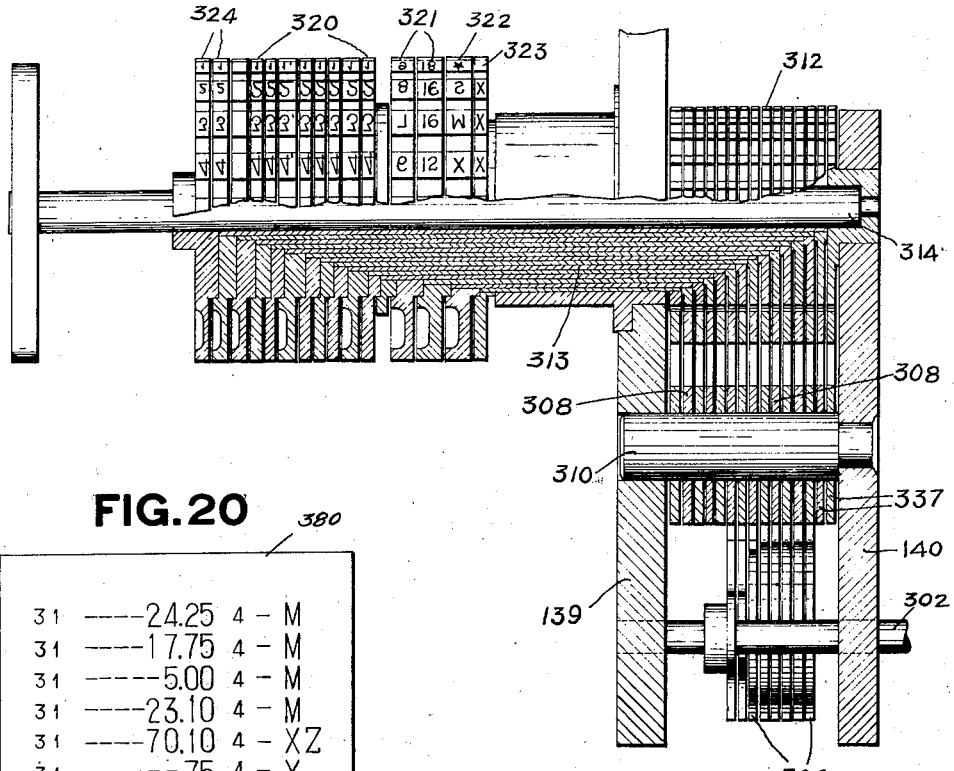

May 3, 1927.
B. M. SHIPLEY
1,626,880
CASH REGISTER
Original Filed Jan. 12, 1920    15 Sheets-Sheet 12
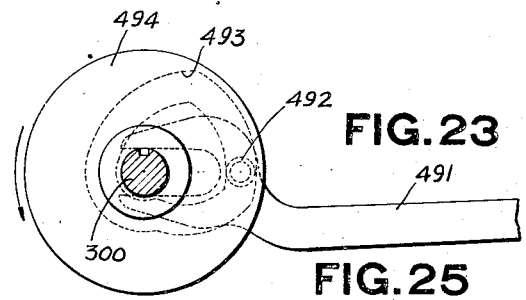
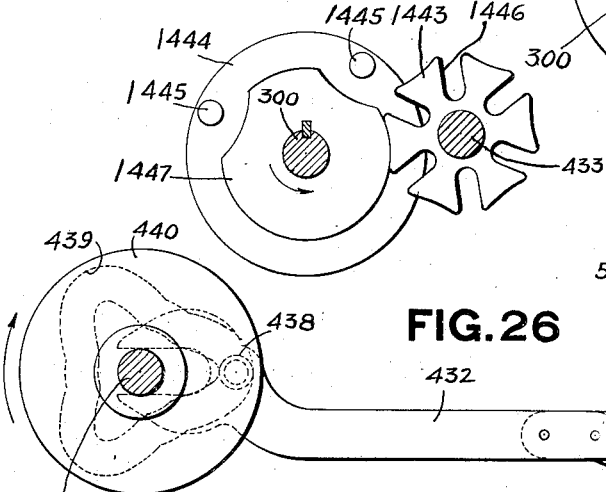
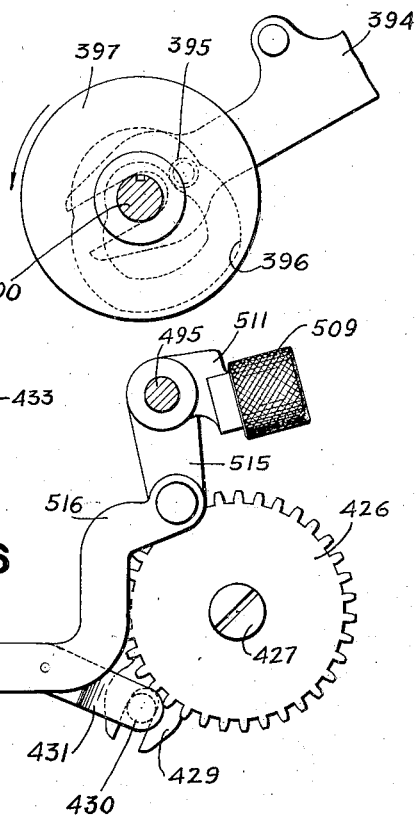
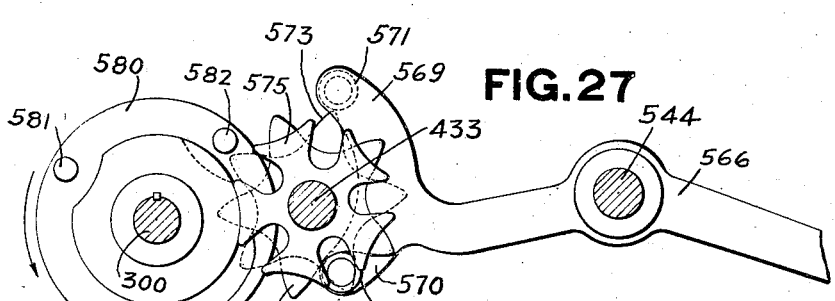
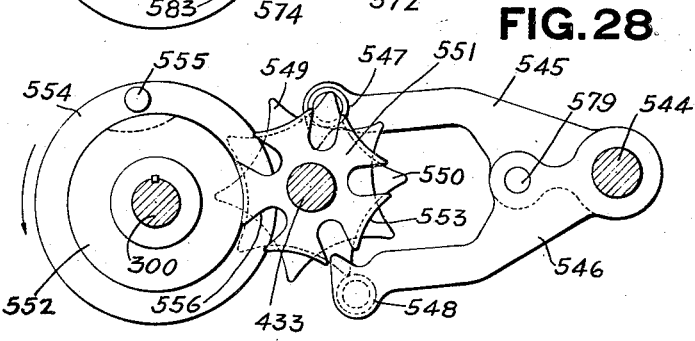
Inventor
BERNIS M. SHIPLEY
Attorneys May 3, 1927.
B. M. SHIPLEY
1,626,880
CASH REGISTER
Original Filed Jan. 12, 1920    15 Sheets-Sheet 13
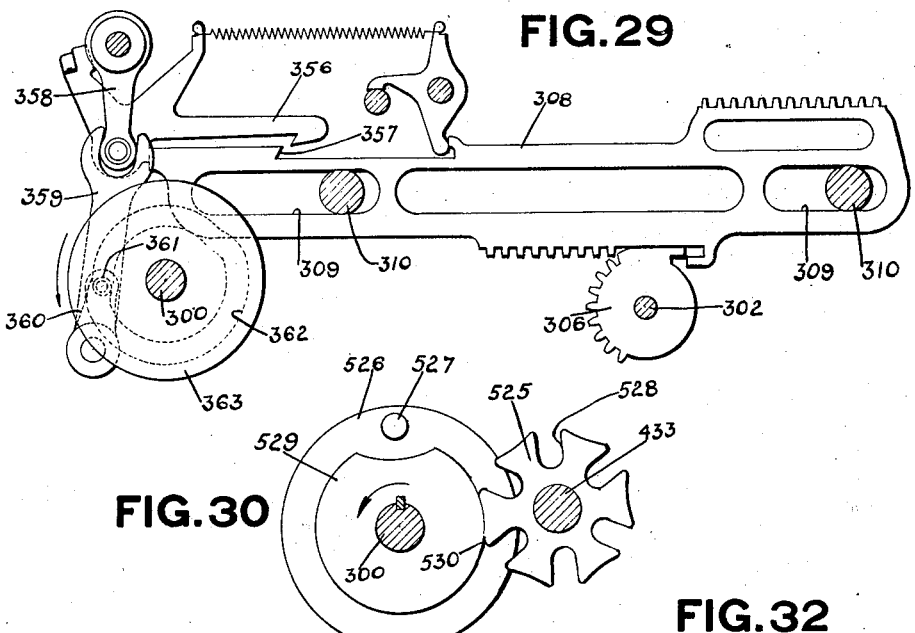
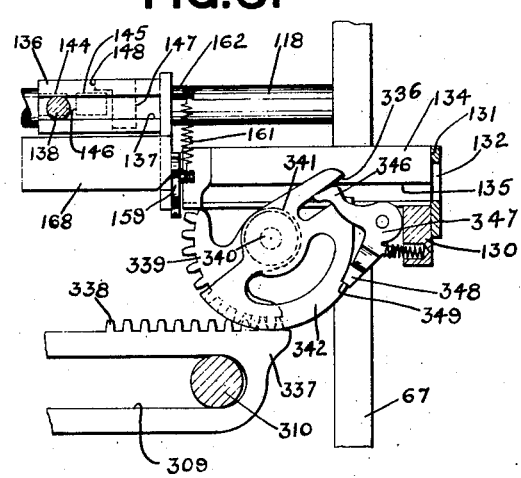
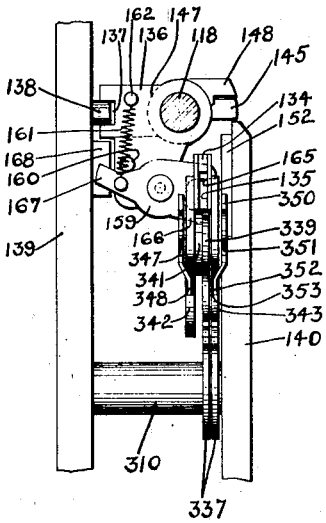
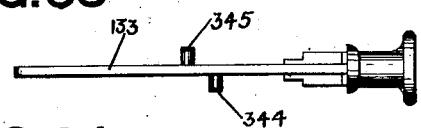
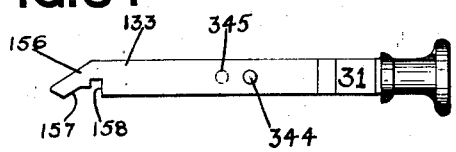
Inventor
BERNIS M. SHIPLEY
by Karl Benst
Henry C. Stauffer
Attorneys May 3, 1927.

B. M. SHIPLEY 1,626,880

CASH REGISTER

Original Filed Jan. 12, 1920  15 Sheets-Sheet 14

FIG. 35A

Inventor
BERNIS M. SHIPLEY
BY
Attorneys

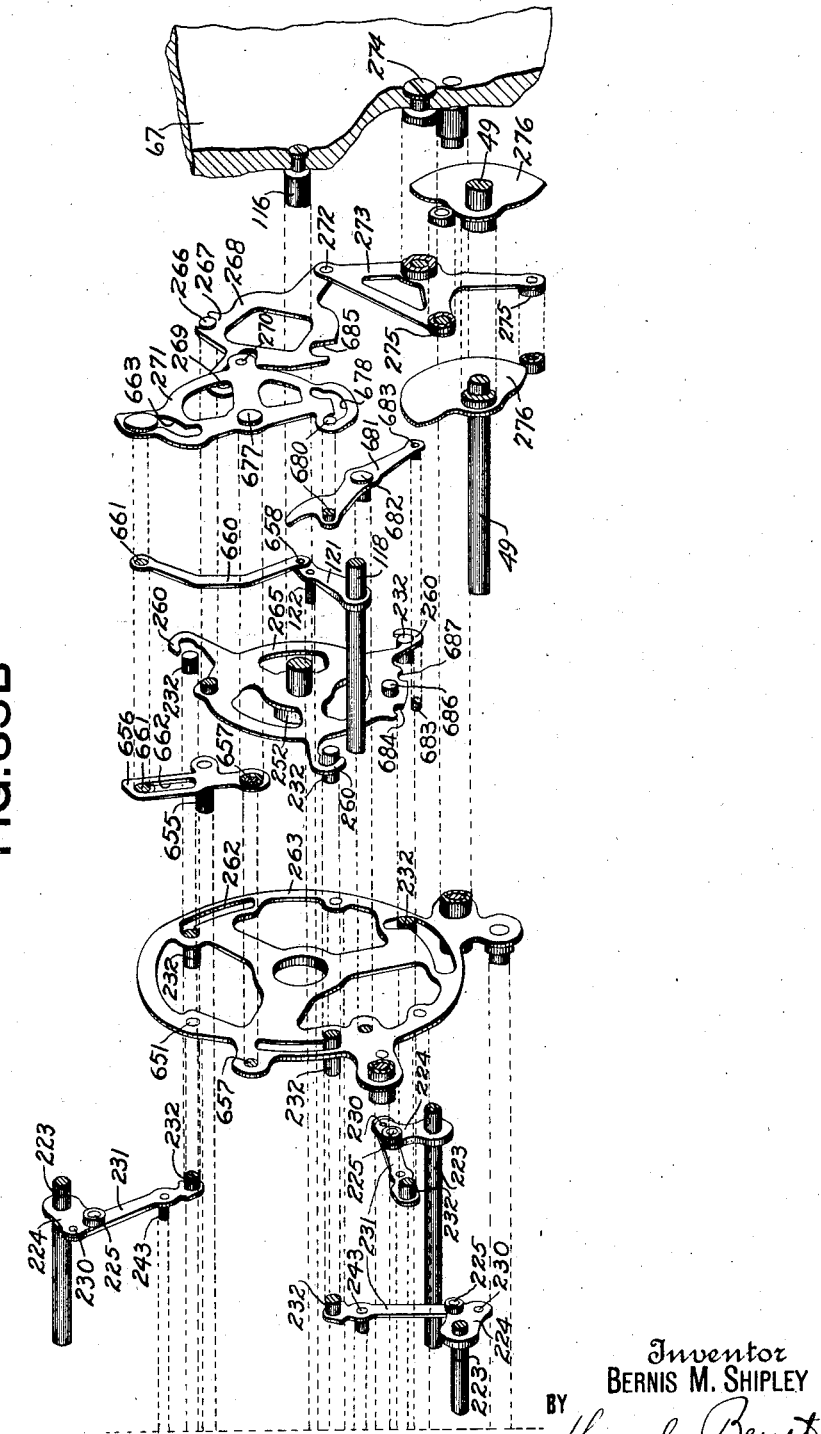

Patented May 3, 1927.

1,626,880

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed January 12, 1920, Serial No. 350,917. Renewed April 3, 1925.

This invention relates to cash registers, the primary object being to devise a machine adapted for use in mail order houses and the like. The machine is more particularly adapted for use by concerns where the records of orders from the various States are segregated so that the total business from any particular State is obtainable at any time.

Another object of the present invention is to provide a novel form of printing mechanism adapted to print upon two record strips and an inserted order sheet.

A novel form of control for the type carriers is provided whereby one record strip receives an itemized record of an order received and the other record strip receives only a total of said order.

Another object of the present invention is to provide the printing mechanism with a novel form of control mechanism for the feeding of the order sheet whereby an itemized record of the order received may be printed upon said slip and also a total of said order, after which said slip is ejected from the machine.

With these and incidental objects in view the invention consists in certain novel features of construction and combinations of parts, the essential elements of which are hereinafter described with reference to the drawings which accompany and form part of the specification.

Of said drawings:

Fig. 2 is a vertical sectional view through the machine, taken alongside of one of the State key banks.

Fig. 3 is a sectional view on line 3—3 of Fig. 2, looking in the direction of the arrows.

Fig. 4 is a diagrammatic view of the State keys and control keys and illustrates the positions to which the total lever may be moved to get the various State totals.

Figs. 5 and 6 are detail views of the totalizer line selecting plates.

Fig. 7 is a vertical sectional view through the machine, taken alongside of the control bank.

Fig. 10 is a plan view of the mechanism shown in Fig. 8.

Fig. 11 is a vertical sectional view on the line 11—11 of Fig. 10, looking in the direction of the arrows.

Fig. 12 is a plan view of the printing mechanism and shows a part of the mechanism for setting up the type carriers.

Fig. 13 is a vertical sectional view on line 13—13 of Fig. 12, looking in the direction of the arrows.

Fig. 14 is a vertical sectional view on the line 14—14 of Fig. 12, looking in the direction of the arrows.

Fig. 15 is a vertical sectional view on the line 15—15 of Fig. 12, looking in the direction of the arrows.

Fig. 16 is a vertical sectional view on the line 16—16 of Fig. 12, looking in the direction of the arrows.

Fig. 17 is a detail view of the mechanism for controlling the feeding mechanism of the lower detail strip.

Fig. 18 is a detail view of the cam and associated lever for operating the aligner for the type wheels.

Fig. 19 is a view of the type line partly in section and illustrates a part of the mechanism for setting the same.

Fig. 20 is a view showing a portion of the upper detail strip.

Fig. 21 is a view showing a portion of the lower detail strip.

Fig. 22 is a reduced view illustrating the itemized printing on an order sheet.

Fig. 23 is a detail view of the cam and a portion of the associated pitman for feeding the order sheet.

Fig. 24 is a detail view of the cam and a portion of the associated pitman for feeding the upper detail strip and the ribbon.

Fig. 25 is a detail view of the Geneva mechanism for operating the cam for feeding the lower detail strip and operating the order sheet tension mechanism.

Fig. 26 is a detail view of the cam and associated parts for feeding the lower detail strip and operating the order sheet tension mechanism.

Fig. 27 is a detail view of the Geneva mechanism and associated lever for operating the lower impression.

Fig. 28 is a detail view of the Geneva mechanism and associated mechanism for operating the upper impression.

Fig. 29 is a detail view of the zero elimination mechanism.

Fig. 30 is a detail of the Geneva mechanism for operating the gear train for the ejection of the order sheet.

Fig. 31 is a detail view of the mechanism associated with the cashier's key.

Fig. 32 is an end view of the mechanism illustrated in Fig. 29.

Figs. 33 and 34 are edge and side views, respectively, of a cashier's key.

Figure 1:
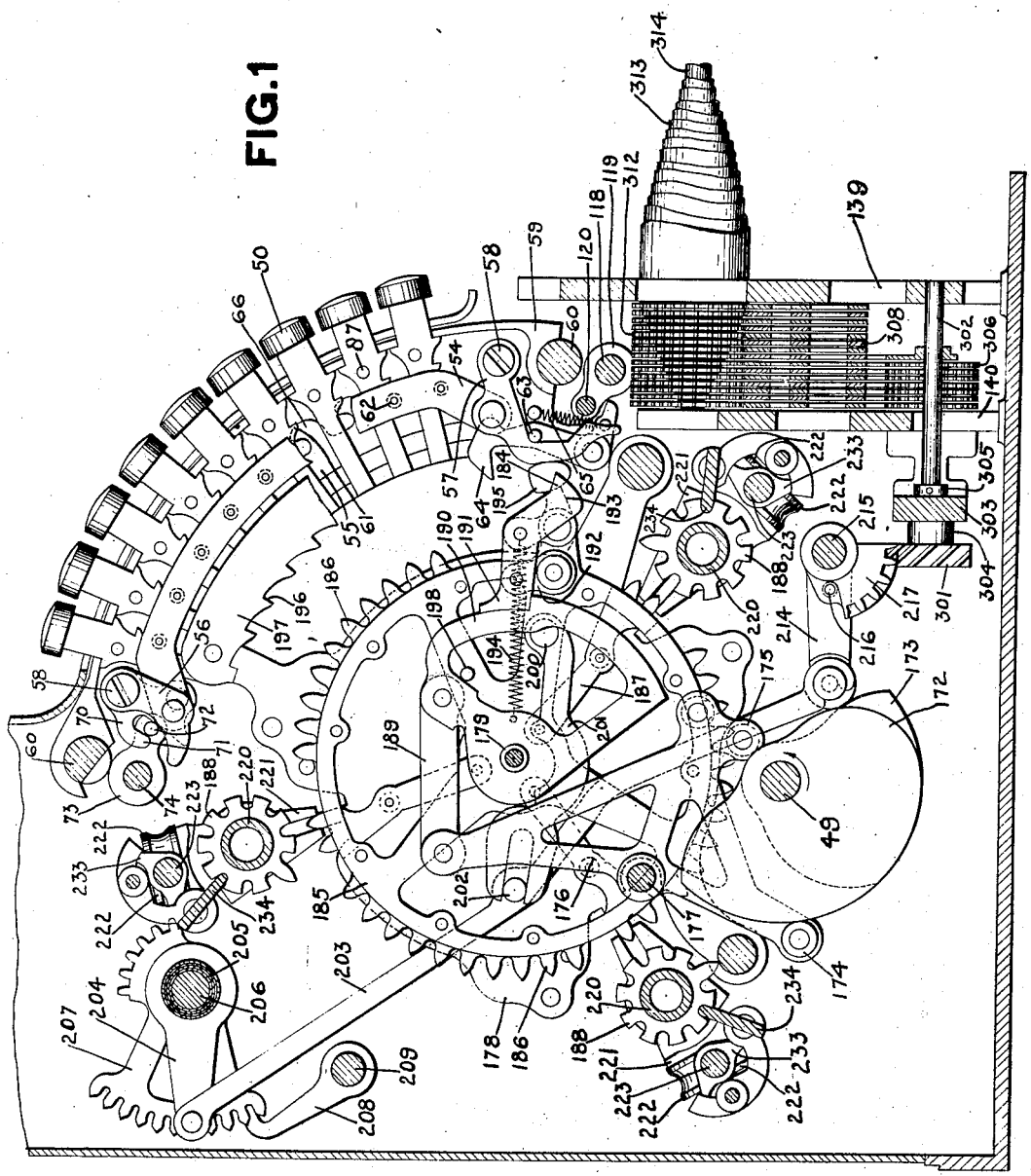
Fig. 1 is a vertical sectional view through the machine, taken alongside of one of the amount banks, a part of the flexible detent and the inside key cover being broken away to show the key shanks.

Figs. 35^A and 35^B together constitute a disunited perspective view of the totalizer engaging controlling mechanism.

Fig. 36 is a detail view of the mechanism for controlling two revolutions of the cam shaft during totalizing operations.

Fig. 37 is a detail view showing a portion of the lower detail feed control.

Fig. 38 is a plan view of the mechanism of Fig. 17, except the controlling cam.

The machine herein disclosed is of the general type illustrated and described in the Letters Patent of the United States, No. 1,242,170, and No. 1,394,256 issued to F. L. Fuller, October 9, 1917, and Oct. 18, 1921, respectively, and the patent to W. A. Chryst, No. 1,230,864, issued on June 26, 1917. The improved machine in the illustrated and preferred form of embodiment disclosed herein is designed more especially for use in mail order houses and the like where it is desired to keep a record of the business from the various States in the Union, the keyboard being arranged for such classification.

Described in general terms the machine comprises a plurality of amount key banks, the number depending upon the capacity desired, a plurality of State key banks, a bank of control keys and a total lever. There are also provided a plurality of totalizers, one for each State, one for accumulating the amounts of all the States and two special totalizers upon which is accumulated the amount of each individual order when said order is a mixed order. By a mixed order is meant when any one orders more than one article on the same order sheet. The control keys are marked beginning at the top, with "X" for the first key, "M" for the second, "S" for the third, and a black star for the fourth key.

In registering a mixed order the operator first sets the amount keys commensurate with the amount of the first item ordered and then depresses the State key corresponding to the State from which the order is received and finally depresses the "M" key which releases the machine for operation. The operator depresses the amount keys commensurate with the amount of the second item, depresses the State key as before and then depresses the "M" key to release the machine for operation. This is done until all the items on the order have been registered in the machine, after which the total lever is moved down to the position opposite the inscription "Ala. to Fla. X Totals" (provided the order was from any of the States indicated between the Ala. to Fla. keys). The operator then depresses the State key as before and then depresses the "X" key to release the machine for operation. The depression of the "X" key with the total lever in the above mentioned position causes a total of the amount of the various items in the mixed order to be printed.

The machine is provided with a printing mechanism which has two detail strips, an upper and a lower, and which is also adapted to print on an inserted order sheet. In the operation just described the amount of each individual item is printed upon the upper detail strip and also upon the inserted order sheet. The number of the State and the "M" are printed, after each individual item. When the "X" key is depressed, the total of the items and the number of the totalizer are printed upon the upper detail strip and upon the order sheet directly beneath the individual items printed thereupon. This operation also prints an "XZ" which denotes that it is the total of the above mixed order and also that the totalizer was reset to its zero position, the "Z" being used for this particular indication of totalizer resetting. If the totalizer had not been cleared and the amount had only been read an "XX" would have been printed in place of the "XZ" which denotes that the totalizer was not cleared after the operation. Upon the lower detail strip is printed only the total of the mixed order. If the order includes only one item the amount keys are first depressed and then the State key and then the "X" key. This record is printed upon both detail strips and also upon the order sheet, there being only one item in the order the amount will of course be the total. Therefore, this item is printed upon the lower detail strip. When it is desired to print the total of any particular State the total lever is moved to the corresponding position opposite the "State totals", the corresponding State key is depressed, and the "S" key is then depressed and a printed record upon the upper and lower detail strips will be made showing the total amount of business from the particular State. When it is desired to print a total of the business from all of the States the total lever is moved to the "Grand total" position after which the black star key is depressed and the machine operated as in other total printing operations whereupon the grand total of all of the States is recorded upon both the upper and the lower detail strips.

Operating mechanism.

The operating mechanism which it is desired to use with the present invention, is of the well known type shown and described in the above mentioned Fuller Patent, No. 1,242,170, in which both an electric motor and a hand operated drive are provided. Either of these may be used to give the shaft 49 one rotation for adding operations and two rotations for total printing operations and for a detailed description of said operating means reference may be had to the above mentioned patent.

Keyboard.

The keyboard comprises six banks of amount keys 50, one bank of which is shown (Fig. 1), two banks of State keys 51 (Figs. 2 and 4), one bank of control or release keys 52 (Figs. 4 and 7), a total lever 53 (Figs. 4, 8 and 11 and 35ᴬ). The amount key banks are substantially the same as those illustrated and described in the above mentioned Fuller patents and, therefore, but a brief description of them will be given herein. The amount keys 50 (Fig. 1) cooperate with key detents 54 and locking detents 55. The detents 54 are supported at their upper and lower ends respectively, by arms 56 and 57 pivoted on studs 58 on key frames 59. The key frames 59 are mounted on cross rods 60 carried by side frames 67. When a key is depressed the inclined edge of the shoulder 61 on the key shank engages a corresponding pin 62 of the detent 54 thereby moving the latter downward until the shoulder is past the pin, when the detent rises slightly retaining the key in depressed position. The arm 57 engages a pin 63 on a zero stop pawl 64 normally in effective position but when the detent 54 is moved downward said pawl 64 is rocked clockwise (Fig. 1) to render it ineffective. A spring 65 connected at one end to the zero stop pawl 64 and at the other end to the key frame 59 serves to retain the pawl and the detent 54 in normal position. The locking detents 55 for the banks of amount keys are provided with extensions 66 which immediately upon the depression of any of the control keys 52 to release the machine, pass over the pins 87 on the depressed key and under the pins 87 on the undepressed keys thereby preventing manipulation of the keys during an operation of the machine. The upper supporting arm 70 for the locking detent 55 is provided with an extension 71 extending over a rod 72 carried by arms 73 fast on a shaft 74. This shaft 74 is rocked counterclockwise (Fig. 1) upon depression of any of the release keys 52, as will be hereinafter described, whereupon the rod 72 rocks the arm 70 thereby elevating the locking detent 55 into locking position.

The construction of the State key banks is substantially the same as that of the amount key banks just described. The keys 51 cooperate with the detent 76 supported by arms 77 and 78 mounted on studs 79 carried by the key frame 80 mounted on the rods 60. The arm 78 engages a pin 75 carried on a zero stop pawl 69, said pawl and said arm being held in the normal position by a spring 68 stretched between the lower end of the zero stop pawl 69 and a pin secured to the key frame 80. When a key is depressed in a State bank the detent 76 is moved downward and means, hereafter to be described, hold the key in depressed position. This movement of the detent rocks the zero stop pawl 69 to render it ineffective. A locking detent 81 is provided, the upper end of which is connected to an arm 83 pivoted upon the stud 79. The arm 83 is provided with a projecting nose 84. The depression of one of the keys 51 engages a pin 85 carried thereby with an inclined slot 86 formed in the locking detent 81 and causes said detent to be cammed downward. The downward movement of the detent positions it beneath the pins 85 on the undepressed keys and prevents their manipulation during an operation of the machine. Means is provided for holding the locking detent 81 in its moved position during the operation of the machine and this means comprises a pawl 90 loose on the shaft 74 and provided with a notch 91 in its outer end. When the detent 81 is moved downward the nose 84 of the arm 83 is moved rearward to permit the pawl 90 to be moved upward under the action of its spring 92 until the nose 84 lodges in the notch 91 where it is held thus holding the locking detent 81 in its locking position and retaining the keys until the pawl 90 is rocked clockwise to release the nose 84. At the proper time during the latter part of the operation of the machine the shaft 74 is rotated clockwise (Figs. 1 and 2) and arms 93 pinned to said shaft contact with pins 94 carried by the pawls 90 and rock said pawls clockwise to release all of the noses 84 which are lodged in the notches 91 of said pawls to permit the locking detents 81 to return to normal position.

In machines of the type shown herein and those described in the above mentioned Fuller and Chryst patents, locking means is provided for normally preventing operation of the machine either by hand or motor until any one of certain designated keys is depressed. These keys which are known as control or release keys, have a number of different designations depending upon the use for which the machine is designed. In the present instance the four keys 52 are the release keys for the machine and consequently the machine cannot be operated unless one of these keys is depressed.

Only a portion of the releasing mechanism is shown herein and for a full description of the same reference may be had to the above mentioned patents. Loose on a shaft 97 carried by the side frames 67 is a casting 98 (Fig. 7). Depression of any of the keys 52 will rock said casting in a clockwise direction. This is accomplished by pins 99 carried by the keys 52 which engage slots 100 in a detent 101 supported at its upper and lower ends on arms 102 and 95 pivoted on studs 103 carried by the key frame 104. The arm 102 is provided with a pin 105 which projects into a slot 106 of the casting 98. Upon the depression of any of the keys 52 the detent 101 is moved downward thereby rocking the arm 102 counter-clockwise which rocks the casting 98 in a clockwise direction so that the shaft 74 may be rocked to release the machine, as is fully described in the above mentioned Fuller patents. There is provided another detent 107 supported by arms 108 and 109 mounted on the studs 103. The arm 95 engages a pin 110 carried by a zero stop pawl 111 for this bank of keys. The depression of any of the keys 52 causes the detent 101 to be moved downward thus rendering said zero stop ineffective. The detent 107 is provided with two pins 112 which co-operate with the "M" key and the black star key. For reasons to be hereinafter described the "X" key and the "S" key do not co-operate with pins 112.

The total lever 53 is integral with a circular plate 115 (Figs. 8, 10 and 11, 35$^A$ and 35$^B$) mounted on a stud 116 projecting from the right hand side frame 67. The lever 53 is movable in a slot 117 (Fig. 4) to adjust it to the desired position. If the lever is moved one step or more above the "Add" position it controls the machine for printing a sub-total and when moved one step or more below the "Add" position it controls the machine for printing a total. When the total lever is moved out of the "Add" position, it operates means to prevent depression of amount keys during total or sub-total printing operations. This means comprises a shaft 118 Figs. 1, 8 and 11 and 35$^B$) carrying arms 119 (only one of which is shown in Fig. 1) which support a rod 120 co-operating with the lower front edge of the arm 57 of the amount key banks. When the total lever is adjusted out of the adding position the shaft 118 is rocked counter-clockwise (Fig. 1), through an arm 121 (Figs. 8 and 11 and 35$^B$) fast on said shaft. Said arm 121 carries a pin 122 projecting into an opening 123 formed in a lever 124 carrying a pin 125 which projects into a slot 126 formed in the plate 115. Pivoted on the lever 124 at 113 is an arm 114 (Figs. 11 and 35$^A$) carrying a stud 127 engaged by a pawl 128 pivoted at 141 on the lever 124. The under surface 142 of the arm 114 and the lower edge of the opening 123 form a cam slot for the pin 122 carried by the arm 121. When the total lever 53 is moved out of the adding position the cam slot 126 therein through the pin 125 rocks the lever 124 counter-clockwise and thereby, through the engagement of the lower edge of the opening 123 and the edge 142 with the stud 122, rocks the arm 121 and consequently the shaft 118 in a clockwise direction (Fig. 11).

Co-operating with the release bank of keys 52 and the total lever 53 there is a device which compels the insertion of a removable cashier's key 133 (Figs. 33 and 34) before any of the keys in the release bank or the total lever can be operated. Secured to the right hand side frame 67 (Fig. 12) is a block 130 having fast thereto a plate 131, provided with an opening 132 (Fig. 31) through which the cashier's key 133 may be inserted. Secured to the block 130 is a plate 134 formed with a slot 135 running lengthwise thereof, said slot being used as a guide for the key 133. Slidably mounted upon the shaft 118 (Figs. 31 and 32) is a block 136, provided with a groove 137 into which projects a pin 138 carried by a frame 139. The block 136 is provided with two lugs 144 and 145 which are so arranged that they form a slot 146 (Fig. 31). Fast on the shaft 118 is a collar 147 having integral therewith a projecting portion 148 below which the lug 145 lies when there is no key 133 in the machine. In a frame 140 are two notches 149 and 150 (Figs. 12 and 16) with which normally register notches 153 and 154 respectively formed in a plate 152 slidably mounted upon two studs 151 carried by the frame 140. Projecting into the notches 149 and 150 are the lower ends of the arms 109 and 95 respectively, of the release key bank. When the block 136 is in the position shown in Fig. 31 the lugs 144 and 145 are opposite the notches 149 and 150. The block 136 is adapted to be slid to the left (Fig. 31) by means to be hereinafter described, whereby the notch 146 will register with the notch 149 and at the same time the lug 145 will move away from the notch 150 and the projection 148. It will be remembered that the arms 95 and 109 are rocked counter-clockwise (Fig. 7) upon the depression of the keys 52. All four of said keys rock the arm 95 but only the "M" and black star keys rock the arm 109 because these are the only ones which cooperate with pins 112. Therefore, when the block 136 is moved to the left into the position, just described, said arms 95 and 109 can enter into the notches 149 and 150 far enough to allow any release key to release the machine for operation. As stated above when the block 136 is in the position shown in Fig. 31, the notch 146 does not register with the notch 149 in Fig. 16 and the projection 148 lies under lug 145 in front of the notch 150 shown in Fig. 16. From this it can be seen that it is impossible to rock the arm 109 counter-clockwise and therefore a depression of any of the release keys 52 is impossible.

The means for moving the block 136 to the left in Fig. 31 is the key 133 which as before stated is inserted into the opening 132 in the plate 131. When the key is inserted in said opening and pushed in as far as it will go it will by means to be later described, move the block 136 to the left a distance sufficient to cause the projections thereon to clear the notches in the frame 140. The key 133 is beveled at 156 and 157 and is provided with a notch 158. When the key is inserted in the opening 132 it must be inserted with the notch 158 down. Pivoted on the side of the block 136 is a lever 159 held in engagement with a pin 160 by means of a spring 161. The lever 159 is provided with two prongs 165 and 166. When the key 133 is pushed into the guide 135 and as it nears the end of its inserted movement the bevel 156 (Fig. 34) engages the prong 165 and rocks the lever 159 counterclockwise whereby the prong 166 thereon is elevated into the notch 158 and by continued movement of the key the member 159 and the block 136 are slid to the left (Fig. 31) on the shaft 118. When the lever 159 receives the full extent of this counter-clockwise movement a portion 167 thereon has been lowered far enough to permit it to pass beneath a block 168 fast on the frame 139 and as the block 136 and lever 159 are slid on the shaft 118 said portion 167 is slid beneath the block 168 thereby holding the key 133 in the "In" position. When the key is withdrawn the notch 158 being in engagement with the prong 166 moves the lever 159 and the block 136 to the right (Fig. 31) until the portion 167 of the lever 159 is withdrawn from underneath the block 168 after which the spring 161 rocks the lever 159 clockwise to normal position thereby releasing the prong 166 from the notch 158 whereby the key may be fully withdrawn from the machine. The means for preventing the total lever from being moved when the key 133 is not in the machine is the collar 147 which is fast on the shaft 118. It will be remembered from a previous description with relation to the total lever that the shaft 118 is rocked clockwise (Fig. 32). With the block 136 in the position shown in Fig. 31 it can be seen that the lug 145 on the block 136 lies directly below the portion 148 of the collar 147 and, consequently, it is impossible to rock the shaft 118. Therefore the total lever 53 is locked in the adding position when the key 133 is not in the machine. However, when the key 133 is inserted in the machine and the block 136 moved to the left the lug 145 is moved out of cooperative relation with the portion 148 of the collar 147 thereby allowing the shaft 118 to be rocked by movement of the total lever.

*Differential mechanism.*

To drive the differential mechanism of the machine the drive shaft 49 is provided with a plurality of pairs of cams 172 and 173 (Fig. 1) each pair co-operating with rollers 174 and 175 respectively, carried by Y shaped levers 176 pivoted at 177 on one of a pair of frames 178 only one of which is shown. Loose on hollow studs or bearings 179 carried by the frames 178 which support the differential units adjacent the amount banks are differentially movable members 185 carrying racks 186 and transfer arms 187 for operating totalizer pinions 188.

The upper ends of the levers 176 are connected by links 189 to driving segments 190 loose on the studs 179. The segments 190 adjacent the banks of amount keys are connected to the differentially movable members 185 by latches 191 each of which is supported by an arm 192 and a lever 193 pivoted on the corresponding differential member. Springs 194 hold the rear ends of the latches 191 in engagement with the shoulders on the driving segments 190. When the segments 190 associated with the amount keys are driven by their cams 172 and 173 the members 185 are rotated counter clockwise with their latches until the portions 195 of the levers 193 engage the depressed amount keys. Such engagement results in the disengagement of the latches from the driving segments and engagement of the ends 184 of the latches 191 with the particular notches 196 formed in plates 197 opposite the latches at the time. Upon return movement of the segments 190 to normal position said segments engage a stud 198 carried by the members 185 and return said members to their normal positions. If a key has not been depressed in an amount bank the zero stop pawl 64 for that particular bank operates the latch to arrest the member 185 in the zero position. However, when a key is depressed the arm 57 rocks the zero stop pawl 64 clockwise to ineffective position, as previously described.

The differential mechanisms which co-operate with the State key banks and the release key banks are substantially the same as those just described in connection with the amount key banks except that the differentially movable members 185 are omitted and arms 199 (Figs. 2 and 7) are substituted therefor. Said arms are driven through the latches 191 by the driving segments 190 in exactly the same manner in which the members 185 are driven.

Pivoted to each of the members 185 and arms 199 at a point 200 is a beam 201 bifurcated at its rear end to surround a stud 202 mounted near the center of a link 203. The links 203 are pivoted at their upper ends to arms 204 secured to one end of nested sleeves 205 on a shaft 206 carried by the side frames 67. Secured to the other ends of the sleeves 205 are aligning segments 207 engaged by aligners 208 fast upon a shaft 209 (Fig. 1). The beams 201 are operated in the usual manner, described in the above mentioned Fuller patents, to differentially position the link 203 and consequently the arms 204 and the segments 207. The means for rocking the aligners 208 into and out of mesh with the segment is not shown herein as said means is fully illustrated and described in a Fuller Patent No. 1,163,748, dated Dec. 14, 1915. Pivoted to the lower end of each of the links 203 is an arm 214 loose on a shaft 215. Loose on the shaft 215 and connected by a pin 216 to the arm 214 is a spiral segment 217. The differential positioning of the link 203 differentially positions the arm 214 and the segment 217 for the purpose of setting up the printing elements to be later described, commensurate with the value of the keys depressed.

The differential mechanism associated with the State key banks sets up printing elements to designate the States.

The connection from the release key differential to its corresponding printing wheel is identical with that shown for the State keys. This printing wheel prints a character to designate which of the release keys 52 is depressed.

*Totalizers and totalizer selecting mechanism.*

Only a general description of the totalizers will be given herein since they are substantially the same as those fully illustrated and described in the previously mentioned Chryst patent. In the present case it is throught sufficient to state that each totalizer line consists of a plurality of individual totalizers 188 loose on tubes 220 (Fig. 1) fixed in frames 221, one at each end of said tube. These frames 221 are each provided with a pair of rollers 222 engaging a shaft 223. Fast on the shaft 223 is an arm 224 (Figs. 8 and 11) carrying a roller 225 extending into a cam slot 226 in a fixed plate 227 (Fig. 9). Pivoted to the arm 224 at 230 is one end of a link 231, the other end of which carries a pin 232 which is operated to rock the totalizer wheels 188 into and out of mesh with the differential mechanism, as will be hereafter described. The rocking movement of the shaft 223 through a pair of cams 233 (Fig. 1) controls the operation of the aligning devices 234 for the totalizers the same as the aligning devices illustrated and described in the above mentioned Chryst patent.

For each State there is an individual totalizer. The totalizers for "Ala." to "Fla." are the left hand or back group (Fig. 1). The "Ga." to "Me." totalizers are the upper group. The totalizer in the zero position on the "Ala." to "Fla." line is used for accumulating the amounts of mixed orders, received from the "Ga." to "Me." States. The totalizer in the zero position on the "Ga." to "Me." line is used for accumulating the amounts of mixed orders received from the "Ala." to "Fla." States. The means for controlling the engaging of these totalizers will be hereinafter described. The right hand or front totalizer line (Fig. 1) is provided with one totalizer in the machine disclosed herein, and is used to accumulate the amounts or orders taken in from all States.

The arrangement of the individual totalizers 188 is substantially the same as that shown and described in Letters Patent of the U. S. No. 1,109,763, granted to C. F. Kettering on Sept. 8, 1914. As this arrangement is fully shown and described in the above mentioned Kettering patent it is not thought necessary to describe the same herein. This arrangement is also shown in the above mentioned Fuller Patent No. 1,394,256. The means for shifting the frames 221 on the shaft 223 to position the individual totalizers for operation by the differential mechanism is under the control of the State keys. This means is substantially the same as that shown and described in the above mentioned Fuller Patent No. 1,394,256, therefore it is not thought necessary to show or describe the same herein.

The totalizer line selecting mechanism which is the means for automatically causing one or more of the totalizer lines to be rocked into mesh with the differential mechanism will now be described. After a particular totalizer line or lines have been shifted to position a totalizer thereon to be operated by the differential actuators, at the proper time the selected totalizer wheels are rocked into mesh with the differential actuators 186. This rocking mechanism is substantially the same as that shown and described in the above mentioned Fuller Patent No. 1,242,170, in that practically all the mechanism shown therein is used in the present machine with an auxiliary control mechanism added. This control mechanism, referring to Figs. 8, 10 and 11 comprises a rotatable spider 238 loose upon the sleeve 252. Associated with each of three knobs 239 formed on the spider 238 is a pivoted lever 240 and a link 241, said link being connected to the link 231 by a slot 242 therein and a pin 243 carried by the link 231. One of the levers 240 is oscillated back and forth by a link 244. Said link carries a stud 236 engaging a hook 237 on a lever 245 carrying a roller 246 projecting into a cam race 247 formed in the side of a disk 248 fast on the cam shaft 49. One revolution of the disk 248 will through the link 244 rock the levers 240 and the spider 238 back and forth. Each of the links 241 carries a pin 249 and if no obstruction is placed in the path of said pin 249 these links 241 will rock idly with the pins 243 as a pivot and therefore will not actuate the link 231 to position the pin 232 so that said pin will, by means to be hereinafter described, be moved to rock the shaft 223 to move the totalizer wheels into mesh with the differential actuators. However, if an obstruction is placed in the path of the pin 249 the rocking of said lever 240 will, first, using the obstructed pin 249 as a fulcrum, rock the link 241 to set the pin 232 carried by the link 231 in position to be moved to rock the totalizer line into mesh with the differential actuators.

The means for placing an obstruction in the path of any one or more of the pins 249 comprises two plates 250 and 251 (Figs. 5, 6, 10, 11 and 35ᴬ) loose on a sleeve 252 mounted on the stud 116, the diameter of the plates being such that their peripheries are adjacent the pins 249, said pins being long enough to co-operate with both plates (Fig. 10). The plate 250 is differentially rotated upon the sleeve 252 by means of a link 253 (Fig. 8) the lower end of which is pivoted at 254 (Fig. 5) to the plate 250, the upper end of said link being pivoted to an arm 255 fast on the sleeve 205 which has secured to its other end the link 203 (Fig. 2) which is differentially positioned by the "Ga." to "Me." State keys 51. From this it can be seen that the plate 250 is differentially positioned under the control of these State keys for the purpose of controlling the rocking of the upper totalizer line (Fig. 1) into mesh with the differential mechanism. In its zero or home position it causes the back totalizer line to be engaged with the actuator. The plate 251 is differentially positioned by means of a link 256 (Fig. 11) the lower end of which is pivoted at 257 to the plate 251, the upper end of said link being pivoted to an arm 258 secured to one end of the sleeve 205 which is moved differentially under the control of the release keys 52.

The plates 250 and 251 control the engaging of the totalizer lines only during adding operations. During total printing operations the engaging of the totalizer lines is controlled by the total lever 53, as will be hereinafter described. As before stated, the peripheries of the plates 250 and 251 co-operate with the pins 249 to control the rocking of the totalizer lines during adding operations. By referring to Figs. 5 and 6, the following detailed description of these plates and their control of the totalizer lines will be better understood. The positions "0 to 9" on the plates 250 and 251 correspond to the "0 to 9" positions of the State key banks and the release key bank. The State keys Ga. to Me. control the "1 to 9" positions of the plate 250 and the zero stop pawl 69 for this bank controls the zero position. The release keys control the "1 to 4" positions of the plate 251. There being only four keys in the control bank, the positions above the "4" position of the plate 251 have no function in this machine. The pins 249, as shown in Fig. 11, are in the position whereby the pins 232 have been moved so that they will, by means to be hereinafter described, move the links 231 to rock the shafts 223 whereby the upper, back and front totalizer lines will all be rocked into engagement with the differential actuators.

For illustration let it be assumed that a mixed order has been received from the State of Alabama. The operator depresses the amount keys commensurate with the amount of the first item on the order sheet and then the State key "Ala." and then the "M" key. The "M" key is in the third position and the third position on the front, back and upper sides of the plate 251 (Fig. 6) is a high spot. As before stated the pins 249 extend across both plates and the third position on the plate 251 being a high spot the plate 250 can have no control over the totalizer engaging mechanism. Consequently the pins 249 will meet with obstructions, when the cam race 247 moves the links 244 upward thereby rocking the links 241 in a clockwise direction with the pins 249 as pivots whereby the pins 232 are moved to positions whereby they will control the movement of the links 231 to rock the totalizer lines in the upper, front and back positions (Fig. 1) into engagement with the differential actuators. The back totalizer line is shifted to the "Ala." totalizer position and therefore the first amount of the mixed order is added into the "Ala." State totalizer. There having been no key pressed in the "Ga." to "Me." State bank the zero stop pawl 69 for this bank controls the shifting of the totalizers of the upper totalizer line (it will be remembered that this line also contains the totalizers for the State bank "Ga." to "Me.") and consequently the amount of the first item on the mixed order will be added into the totalizer in the zero position on the upper totalizer line. The grand totalizer being the only totalizer on the front line the amount of the item of this mixed order is accumulated in said grand totalizer. If the above mixed order consists of only two items, the operator after setting up the amount of the second item depresses the "Ala." key and finally the "M" key which releases the machine, the amount of the second item will be added in the same totalizers as before.

Let it be assumed that a mixed order has been received from the State of Ga. The operator first depresses the amount of the first item and then the "Ga." key and finally the "M" key. In this instance the depression of the "Ga" key controls the plate 250 so that the "9" position is opposite the pins 249. The ninth positions for the front and upper totalizer lines are high spots and the ninth position for the back totalizer line is a low spot. The depression of the "M" key controls the plate 251 (Fig. 6) to be moved into the third position the same as just described in the preceding operation. The third position for the back totalizer line being a high spot the back totalizer line will be rocked into engagement with the actuators regardless of the fact that the ninth position on the plate 250 controlled by the "Ga." key is a low spot. Therefore, the amount of this item of the mixed order will be accumulated in the "Ga." State totalizer and in the grand totalizer which is the front totalizer. There having been no key depressed in the "Ala." to "Fla." State key bank the zero stop pawl 69 for this bank controls the shifting of the back totalizer line so that the totalizer in the zero position will be engaged with the actuators when this line is rocked into mesh, and therefore, the amount of the first item of this mixed order for the State of Ga. will be accumulated in this totalizer in the zero position of the "Ala." to "Fla." bank. For the second item of this mixed order for Ga. the operator goes through the same operations depressing the same keys whereby the amount of this item is accumulated into the same totalizers. It is thought from this description that the engaging of the totalizers under the control of the State keys Ga. to Me. and the release keys will be readily understood.

At the proper time during the operation of the machine, the cam 248 (Fig. 11) will move the lever 245 counter-clockwise. This movement, as has been previously described, through the link 244 rocks the lower lever 240 to rock the spider 238 counter-clockwise and thereby rock all of the levers 240 to rock the links 241 counter-clockwise so that the pins 249 carried by the links will be moved away from the peripheries of the plates 250 and 251. This movement of the pins 249 is to permit free clearance between them and the peripheries of the said plates and at the same time allow the pins 232 to be disengaged from hooks 260 (Fig. 8) which are for the purpose of engaging the totalizers with the differential actuators when the pins 232 are within said hooks, as will be hereinafter described. As a consequence, the first part of the movement of the cam 248 disconnects the mechanism for engaging the totalizers so that a new selection may be made. After the pins 249 have been so moved, the plates 250 and 251 are set by the links 253 and 256 through the depression of the keys in the State bank Ga. to Me. and the release bank, as has been previously described. After the plates have been set, and as the cam 248 continues its rotation it raises the link 244 whereby the lower lever 240 causes the spider 238 to move clockwise whereby all of the levers 240 are actuated so that the links 241 will move their pins 249 against the peripheries of the plates 250 and 251. When a pin 249 in its inward movement, that is towards the stud 116, engages a high spot on the periphery of either of the plates 250 or 251 it will be arrested in its movement. Further movement of the lever 240 under the influence of the spider 238 will, using the pin 249 as a fulcrum point, rock the link 241 clockwise and thereby cause an outward movement of the link 231. This movement of the link 231 will cause an outward movement of the pin 232 so that it engages the hook 260. It is to be understood that only those pins 232 which are associated with the links 241 whose pins 249 abut the high spots on the periphery of either of the plates 250 or 251 will be moved outwardly, and that these pins 249 which do not abut high spots but come opposite low spots in both plates 250 and 251 cause the pins 232 to remain in the "In" position whereby they will not be engaged within the hooks 260. When the pins 249 come opposite low spots on the peripheries of both plates 250 and 251 and the pins 232 are moved inward toward the stud 116 said pins are retained in the inner portions 261 of slots 262, formed in a framework 263, by springs 264 which have their ends secured to the spider 238 and to studs carried by the links 241. By referring to Fig. 11 it will be found that all the pins 249 are in the position when the plates 250 and 251 have been set by the differential actuators under the control of the "Ga." to "Me." State keys and the "M" key.

As before stated the engagement of the pins 249 with high spots on either the plate 250 or 251 causes all of the pins 232 to occupy their extreme outer position in the portions 261 of the slots 262 whereby the pins rest within the hooks 260 formed on the disk 265 fastened on the sleeve 252. At the proper time during the operation of the machine the disk 265 is given a clockwise rotation by the following means. A pin 266 (Fig. 8) carried by the disk 265 fits within a slot 267 in a plate 268 supported by a slot 269 receiving a pin 270 carried by a segment lever 271. and by being pivoted at 272 to a V shaped lever 273 pivoted at 274 to the frame 263. Each of the downwardly extending arms of the V shaped lever 273 carries an anti-friction roller 275 cooperating with a plate of a double plate cam 276 fast on the cam shaft 49.

A clockwise rotation of the cam 276 (Fig. 8), through the rollers 275 causes first a clockwise movement of the lever 273 thereby moving the plate 268 to the right in the direction of its length which through the pin 266 rocks the disk 265 clockwise. This movement of the disk 265 through the hooks 260 causes the pins 232 to be moved to the opposite ends of the slots 262 from that shown in Fig. 8. This movement of the pins 232 causes a movement of the links 231 to rock the levers 224 and consequently the shafts 223 to which they are fastened. The rocking of the shafts 223 as has been previously described, causes their associated totalizer lines to be rocked into engagement with the differential actuators.

If any of the pins 232 have been moved to the inner positions 261 of the slots 262, through the pins 249 having been opposite low spots on the peripheries of the plates 250 and 251, said pins 232 will not be engaged by the hooks 260 when the disk 265 is rocked clockwise, and therefore the links 231 will not be moved to rock the levers 224 and the shafts 223. Therefore the totalizer lines associated with these particular levers 224 and shafts 223 will not be rocked into engagement with their differential actuators.

The foregoing is a description of the construction and function of the two plates 250 and 251 and their associated elements when the machine is operated during adding operations, at which time the selection of the totalizer lines for engagement with the differential mechanism is determined entirely by the plates 250 and 251 under the control of the keys in the "Ga," to "Me." State bank and the keys in the release bank.

During total printing operations a different mechanism for controlling the engaging of the totalizer lines is operated, said mechanism being entirely under the control of the total lever 53, the plates 250 and 251 having no control over the engaging of the totalizer lines during sub-total or total printing operations.

When the total lever 53 is moved to a position for a total or sub-total operation a condition is set up by the movement of said lever whereby the two plates 250 and 251 are rendered ineffective. From a previous description it will be remembered that the total lever 53 is integral with a plate 115 fast upon a hub 279 (Fig. 11) loose upon a sleeve upon a hub 252. The plate 115 is provided with a slot 280 (Fig. 11) within which projects a pin 281 carried by one of the levers 240. In Fig. 11 the total lever 53 and plate 115 are shown in the adding position. It will be remembered that during adding operations the levers 240 are moved through the action of the cam 248 and to allow for this movement of said levers the slot 280 is provided with a clearance portion 282 so that the pin 281 will move idly when the lever 240 is actuated during adding operations. When the lever 53 is moved for total or sub-total operations the slot 280 moves the pin 281 and its lever 240 a distance sufficient to move all of the links 241 far enough to position the pins 249 carried by these links away from the peripheries of the plates 250 and 251. All of the links 241 and the pins 249 are moved by the movement of the one lever 240 and pin 281 through the spider 238. With the total lever out of adding position any movement of either of the plates 250 or 251 will have no effect upon the pins 249 for controlling the engaging and disengaging of the totalizer lines with the differential actuators. It has been previously described that a movement of the total lever 53 into a position for total or sub-total operations causes a movement of the lever 124, (Fig. 11) through the pin 125 and slot 126 formed in the plate 115. This rocking movement of the lever 124 is communicated by a link 283 to the link 244, the link 283 having one end pivoted to the lever 124 and the other end pivoted to the lower end of the link 244. Counter-clockwise movement of the lever 124 (Figs. 11 and 35^A) moves the link 283 to the right thereby moving the lower end of the link 244 to the right a distance sufficient to disengage the pin 236 carried thereby from the hook 237 on the end of the lever 245. It will be remembered that the lever 245 is actuated by the cam 248 during adding operations so that the link 244 connected to the lever 245 and by the pin 236 and hook 237 will rock all of the levers 240 to actuate their pins 249 to select the totalizer lines which are to be engaged with the differential actuators.

By disengaging the pin 236 from the hook 237 all driving connection between the lever 245 and the levers 240 is broken. As a consequence the movement of the total lever 53 to total and sub-total positions cripples the driving connection between the cam 248 and the levers 240 so that said levers will receive no actuation from the cam as they do during adding operations. Since the movement of the total lever 53 to total or sub-total printing positions cripples the selection of the totalizer lines under the control of the plates 250 and 251, other means is provided whereby the movement of the total lever 53 to different positions controls the selection of the totalizer lines for operation by the differential actuators. This means comprises, (Figs. 11, 35^A and 35^B), three irregularly shaped slots 286 formed in the plate 115, each of these slots receiving one of the pins 249. The slots 286 are so shaped that when the total lever 53 is moved to total or reset positions the pins 249 will be moved away from the stud 116. Since the levers 240 are held stationary, the movement of the pins 249 causes an outward movement of the links 241 which is communicated to the links 231. This outward movement of the links 231 positions them so that their pins 232 engage within the hooks 260 of the disk 265 so that operation of said disk will move the links 231 and rock the totalizer lines associated therewith into engagement with the differential actuators in the same manner as during adding operations. Each of the slots 286 is of different form. That is, they are so shaped that the pins 249 will be moved alternatively so that their associated pins 232 will be moved into engagement with the hooks 260. This is to insure that only one of the totalizer lines may be selected at a time for engagement during the total printing operations. The above description makes it clear that through the medium of the slots 286 and pins 249, the movement of the total lever itself selects which one of the totalizer lines is to be operated. In addition to selecting the totalizer line which is to be operated it is necessary to set up a condition by the total lever so that the reset pawls of the totalizers will be set to engage the long teeth of the totalizer wheels 188. This means comprises (Figs. 11 and 35^A) three slots 287 formed in the plate 115. Projecting within the slots 287 are pins 288 carried by levers 289 pivoted at 290 to a stationary plate 297. The free end of each of the levers 289 is bifurcated to surround a pin 291 carried by one end of a link 292 the other end of which is pivoted to an arm 293 fast on a shaft 294 which carries the means for actuating the reset pawls for the totalizer wheels 188. The reset pawls and the means for actuating them are not shown in the present application as they are substantially the same as those illustrated and described in the above mentioned Fuller Patent, No. 1,242,170, and therefore it is not thought necessary to describe them. All of the slots 287 are different and are arranged to co-operate with the slots 286 so that when one of the totalizer lines is selected to be rocked into mesh with the differential actuators its associated reset pawl will be selected through the medium of the slots 287 and lever 289. When the total lever 53 is moved to select a totalizer line, one of the pins 288 moving in a slot 287 rocks the lever 289 a distance sufficient to move the pin 291 into a notch 295 formed in a plate 296. It is to be understood that there is a notch 295 co-operating with each of the pins 291. The plate 296 is secured to the sleeve 252 to which is fastened the disk 265. The pin 291 which is associated with the engaging lever or mechanism of the selected totalizer line is moved into the notch 295 of the plate 296 so that it is secured thereto. As a consequence when the disk 265 is rotated to engage the totalizer with the differential actuators the plate 296 will be rotated so that the pin 291 which fits within the notch 295 will be actuated so that the link 292 will be moved to rock the lever 293 and the shaft 294 a distance sufficient to set the reset pawls of the totalizer line which has been selected in position to engage the long teeth of the totalizer wheels.

When the total lever 53 is moved very few actual operations take place but merely conditions are set up by positioning various levers and links so that during the operation of the machine a certain totalizer line will be engaged and reset pawls associated with the selected totalizer line will be set in position to engage the long teeth of the totalizer wheels. The means for driving the plate 268 through the segment lever 271 is substantially the same as that shown and described in the above mentioned Fuller Patent, No. 1,242,170, and as it is fully described therein it will be understood from a reading of said patent that the operation of said plate 268 is so timed by the segment lever 271 and its associated elements by movement of the total lever 53 that the selected totalizer is engaged and disengaged at the proper time for printing totals or sub-totals therefrom determined by the position in which the lever 53 is set.

*Total lever control mechanism.*

As the total lever 53 is being moved from its adding position to any of its total or subtotal positions, the shaft 74 is prevented from being rocked by a lever 650 (Figs. 8, 11 and 35^A) pivoted on the stud 651 on the plate 263. Said lever carries a pin 652 projecting in a slot 653 in the total lever plate. The slot 653 rocks the lever 650 clockwise and the upper end of said lever projects over an arm (not shown) on the release shaft 74 thereby preventing said shaft from being rocked while the total lever 53 is between any of its various predetermined positions. When said lever is in the exact position for adding, total or subtotal printing operations, the slot 653 holds the lever 650 away from the arm on the shaft 74 thereby allowing said shaft to be rocked to release the operating mechanism.

Figure 8:
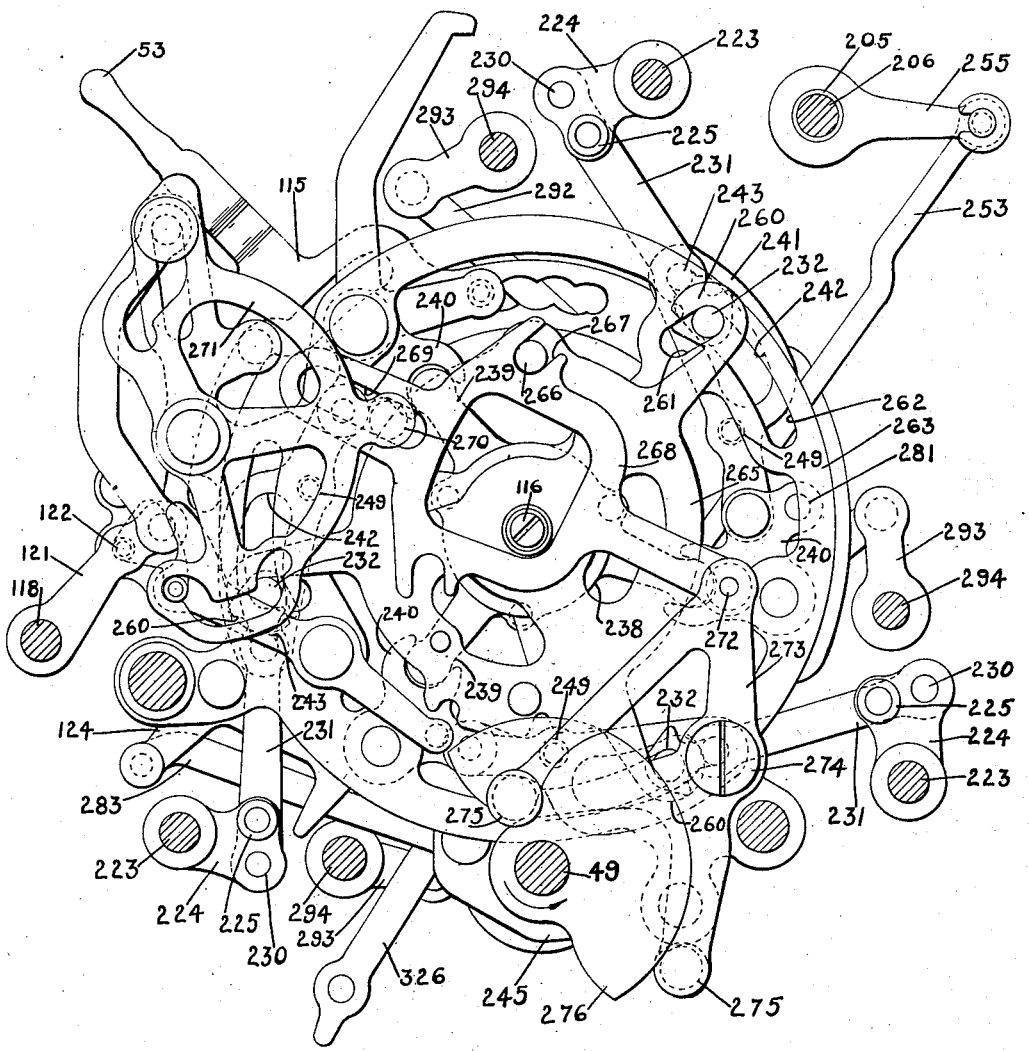
Fig. 8 is a side elevation of the totalizer control mechanism and also shows the total lever and its cooperating parts.
Figure 9:
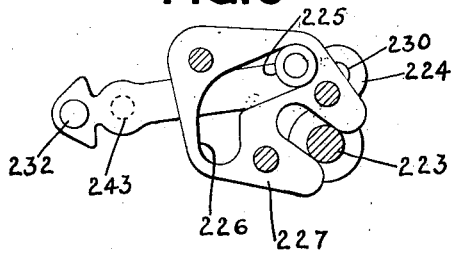
Fig. 9 is a detail view of the cam plate for rocking the totalizer line into and out of mesh with the differential segments.

In total printing operations, the plate 268 is moved to a different position from that shown in Figs. 8 and 35^B. This is done by movement of the total lever 53 preliminarily to an operation of the cam shaft 49, so that the time of the engaging and disengaging of the totalizers may be changed in accordance with the desired operation. When the total lever 53 is moved counter clockwise (Fig. 35^A) for a total printing operation, a slot 654 therein, through its engagement with a pin 655 on a lever 656 (Fig. 35^B), pivoted on a stud 657 on the plate 263, rocks said lever 656 clockwise. At the same time the lever 124 is rocked counter clockwise by the slot 126 as previously described. Pivoted at 658 to the arm 121 (Fig. 35ᴮ) is the lower end of a link 660, the upper end of which carries a stud 661 extending in a slot 662 in the lever 656 and in the straight portion of a slot 663 in the lever 271. The pin 122 on the arm 121 extends in the slot 123 in the lever 124 as previously described, and said lever has pivoted thereto at 113 an arm 114. A pawl 128 pivoted at 141 on the lever 124 engages a stud 127 on the arm 114 and normally holds an extension 142 of the arm 114 so that the under side of said extension and the lower portion of the slot 123 form a cam slot for the pin 122.

From the above description it will be clear that when the lever 124 is rocked counter clockwise by the total lever, the arm 121 and shaft 118 are rocked clockwise (Figs. 35ᴬ and 35ᴮ) through the cam slot formed by the projection 142 and the slot 123.

Clockwise movement of the shaft 118 by the total lever 53 rocks an arm 664 (Fig. 36) and moves a link 665 pivoted thereto, to the left. Said link carries a roller 666 normally resting in a notch 667 in a disk 668 loose on a stud 670 secured to the right side frame. The link 665 also has two pins 671 (Fig. 36) one on each side of a portion 672 of a plate 673 slidably mounted in a gear 674 meshing with a gear 675 fast on the drive shaft 49. The gear (not shown) secured to the crank handle meshes with gear 674. In adding operations the gear 674 receives one-half of a rotation which gives one rotation to the gear 675 and shaft 49. In total and subtotal operations, the gear 674 receives one rotation, which gives two rotations to the gear 675 and shaft 49. In adding operations the plate 673 and its portion 672 are in the position shown in Fig. 36, and the disk 668 does not rotate with the gear 674.

When the link 665 is moved to the left as above described the pins 671 move the plate 673 to the left and connect the disk 668 with the gear 674 and also position the roller 666 in a cam race 676 in the disk 668.

Clockwise movement of the lever 656, as above described, through the stud 661 rocks the lever 271 clockwise about the stud 677, and through the engagement of its pin 270 with the slot 269 rocks the plate 268 counter clockwise with the stud 272 as the pivot point and disengages said plate from the stud 266 on the spider 265.

The lever 271 has a slot 678 (Fig. 35ᴮ) engaging a pin 680 on a lever 681 mounted on a stud 682 carried by the plate 263. The lever 681 also carries a pin 683. Clockwise movement of the lever 271, by its engagement with the pin 680, rocks the lever 681 counter clockwise, whereby the pin 683 engages a notch 684 in the spider 265 and positively locks the spider 265 in this position until one of the pins 232 has been engaged with one of the hooks 260 on said spider.

After the parts have been moved to the position just described by the movement of the total lever 53, the crank handle is given four complete rotations, thereby causing two rotations of the cam shaft 49 (Figs. 35ᴬ and 35ᴮ) in a clockwise direction. The four rotations of the crank handle rotate the gear 674 and the disk 668 (Fig. 36) one complete rotation counter clockwise. During the first rotation of the shaft 49 the lever 273 is rocked clockwise (Fig. 35ᴮ) and moves the plate 268 to the right, in the direction of its length, and positions a notch 685 therein directly above a pin 686 on the spider 265. Immediately after this has taken place the cam 676 (Fig. 36) moves the link 665 to the left and rocks the shaft 118 still further in a clockwise direction. This movement of the shaft 118 rocks the arm 121 (Fig. 35ᴮ) and moves the link 660 downward, whereby the stud 661 through its engagement with the cam portion of the slot 663 rocks the lever 271 still further clockwise, and through the engagement of its pin 270 with the slot 269 rocks the plate 268 still further counter clockwise, with the stud 272 as the pivot point, and engages the notch 685 of said lever with the pin 686 on the spider 265. The clockwise movement of the lever 271 just described also, through the engagement of its slot 678 with the pin 680, rocks the lever 681 clockwise and disengages the pin 683 from the notch 684.

After the notch 685 is engaged with the pin 686, and during the last part of the first rotation of the shaft 49, the lever 273 is rocked counter clockwise and moves the plate 268 to the left, thereby rotating the spider 265 clockwise. This movement of the spider 265 through the engagement of one of its hooks 260 with one of the pins 232 rocks the selected totalizer shaft, as determined by the position of the total lever 53, into engagement with the totalizer actuators previously described.

The totalizer is held in engagement with its actuators by the cams 276 until each of the said actuators have been differentially positioned under the control of said totalizer wheels, after which the lever 273 is rocked clockwise and moves the plate 268 to the right. Immediately after the plate 268 has been moved to the right the cam race 676 (Fig. 36) rocks the shaft 118 and the arm 121 counter clockwise, thereby raising the link 660 and rocking the lever 271 counter clockwise, which rocks the plate 268 clockwise about the stud 272. This movement of the plate 268 disengages its notch 685 from the pin 686. After said disengagement the lever 273 is rocked counter clockwise and moves the plate 268 to the left to the position in which it was placed by the movement of the total lever 53. The last described movement of the plate 268 to the right rocks the spider 265 counter clockwise to normal position thereby disengaging the selected totalizer from the totalizer actuator.

After the plate 268 has been moved to the left as last described the total lever 53 is moved clockwise to its adding position, which rocks the lever 656 counter clockwise. This movement of the lever 656 raises the link 660 and rocks the arm 121 and the shaft 118 counter clockwise to normal position. The stud 661 also rocks the lever 271 counter clockwise to normal position whereby, through the engagement of its pin 270 with the slot 269 it rocks the plate 268 clockwise about the stud 272 so that the notch 267 again engages the pin 266 on the spider 265.

From the above described operation it can be clearly seen that the totalizer of the totalizer line selected by the total lever is rocked into engagement with the totalizer actuators before said actuators are moved differentially and held into engagement therewith until the differential movement of the actuators, under the control of the long tooth on the totalizer pinion 188, is completed, after which said totalizer is rocked out of engagement with the differential actuators, thereby leaving said totalizer at zero.

The control of the engaging and disengaging of the totalizers with the actuators during subtotal printing operations will now be described. For a subtotal printing operation the total lever 53 is moved in a clockwise direction. Clockwise movement of said lever does not rock the lever 656 or the lever 271 as is the case in total printing operations, because the slot 654 is concentric with the center of the stud 116 in all positions of the total lever 53 above its adding position. However, clockwise movement of the lever 53 through the engagement of the slot 126 with the pin 125 rocks the lever 124 counter clockwise in identically the same manner as the said lever is rocked during the total printing operation above described. This movement of the lever 124 also rocks the shaft 118 clockwise, as described above, to connect the disk 668 with the gear 674.

In subtotal printing operations the gear 674 receives one complete rotation and the gear 675 and shaft 49 receive two complete clockwise rotations in identically the same manner as described in connection with the total printing operation. As the lever 271 is not moved by the movement of the lever 53 the plate 268 remains in engagement with the pin 266 on the spider 265.

During the first clockwise movement of the lever 273 the plate 268 is moved to the right and rocks the spider 265 clockwise to engage the selected totalizer with the differential actuator. After the totalizer has been engaged the cam race 676 (Fig. 36) rocks the link 665 still further to the left, thereby rocking the shaft 118 and the arm 121 clockwise, which lowers the link 660, whereupon the stud 661 engages the cam portion of the slot 663 and rocks the lever 271 clockwise about the stud 677. Clockwise movement of the lever 271 rocks the plate 268 counter clockwise about the stud 272 and disengages the notch 267 from the pin 266 on the spider 265. This movement of the lever 271 rocks the lever 681 counter clockwise and its pin 683 engages a notch 687 in the spider 265 and positively locks said spider in this position thereby holding the totalizer in engagement with the actuators. Immediately after the disengagement of the plate 268 from the pin 266 the lever 273 is rocked counter clockwise and moves the plate 268 to the left. This movement of said plate is an idle movement, as it is not engaged with either the pin 266 or the pin 686. The selected totalizer is now engaged with the differential actuators and said actuators are moved differentially under the control of the long teeth on the totalizer pinions 188, thereby resetting said pinions to zero. As previously described, the amount which is on the totalizer is now printed from the type wheels. During the first part of the second rotation of the shaft 49 the differential actuators are again moved and due to the fact that the totalizer pinions are still in engagement therewith the amount that was taken from said pinions is again accumulated thereon. The lever 273 is again rocked clockwise and moves the plate 268 to the right and positions the notch 267 therein directly beneath the pin 266 on the spider 265. The race 676 at this time moves the link 665 to normal position to rock the shaft 118 counter clockwise and raises the link 660 which rocks the lever 271 counter clockwise and thereby rocks the plate 268 clockwise so that it again engages the pin 266. This counter clockwise movement of the lever 271 rocks the lever 681 clockwise and disengages its pin 683 from the notch 687 to allow the spider 265 to be rocked. The lever 273 is then rocked counter clockwise to normal position and moves the plate 268 to the left to normal, thereby rocking the spider 265 counter clockwise, which disengages the totalizer from the actuators.

The total lever 53 is then moved counter clockwise to its normal adding position and through the slot 126 and pin 125 rocks the lever 124 clockwise to normal position and raises the link 660 to the position shown in Fig. 35B. This movement of the total lever 53 also disconnects the disk 668 from the gear 674 so that said disk is not rotated while the total lever 53 is in the adding position.

From the above description it can be clearly seen that during a subtotal printing operation the totalizer is engaged with the actuators and reset to zero by the movement of the actuators and said totalizer is also maintained in engagement until the actuators are again moved, which operation puts back on the totalizer the amount which was taken therefrom so that at the end of a subtotal printing operation the amount on the totalizer is the same as it was before the subtotal printing operation was made.

Printing mechanism.

The entire printing mechanism is driven by the operation of the cash register. The printing mechanism is provided with a cam shaft 300 upon which are cams for driving the various elements of the printing mechanism. The shaft 300 is given one revolution for each operation of the machine whether said operation be an adding operation or a subtotal or total printing operation. The means for rotating the shaft 300 is identically the same as that fully illustrated and described in the above mentioned Fuller Patent No. 1,394,256, therefore it is not thought necessary to illustrate or describe the same herein.

Meshing with each of the segments 217 (Fig. 1) which are actuated by the movement of the differential mechanism is a spiral gear 301 secured to a shaft 302 mounted in the frame 139 and a bracket 303 carried by the frame 140. Hubs 304 on the gears and collars 305 on the shafts hold the shafts 302 in their normal position. Secured to each of the shafts 302 and located between the frames 139 and 140 is a segment 306. Secured to each of the shafts 302 which co-operate with the State key banks and also the release key banks there is also a segment 306. Meshing with the segments 306 (Fig. 16) are teeth 307 formed on the underside of racks 308 slotted at 309 to receive studs 310 which support them. Above the center rod 310 the racks are provided with another set of teeth 311 which mesh with gears 312 secured to nested sleeves 313 (Fig. 19) loose on a shaft 314. To the outer ends of the sleeves 313 and the shaft 314 are secured a set of type wheels which will be later described. From the mechanism just described it can be seen that the differential positioning of the segments 217 moves the racks 308 to different positions whereby the gears 312 are differentially positioned to set up the amount type wheels commensurate with the value of the keys depressed. There are eight type wheels 320 (Fig. 19) secured to the outer ends of the sleeves 313, two type wheels 321 which co-operate with the State key banks, one type wheel 322 which co-operates with a release bank, and one type wheel 323 which co-operates with the total lever 53. On the extreme left are shown two type wheels 324 which co-operate with the cashier's key 133. These type wheels are large enough in diameter to have on their peripheries two separate sets of type, one set on the upper half and one set on the lower half. The reason for the two sets of type is that there are provided two separate impression mechanisms which will be hereinafter described, one set co-operating with the upper set of type and the other co-operating with the lower set of type. As is usual in the art there are provided totalizer wheels for which no banks of keys are employed, these elements being of highest denomination and operated in adding operations only when transfers to them are necessary. Differential units like those controlled by the amount keys are provided to actuate these totalizer elements of highest denomination and through the connections corresponding to those above described, to position the type carriers of highest denomination during total and sub-total printing operations of the machine.

All of the racks 308 which are associated with the amount key banks, the State key banks and the release key bank are the same as far as the setting of the type wheels is concerned. There is, however, one rack 325 (Fig. 16) which is set by the movement of the total lever 53 so that a type wheel will be positioned to print and thereby to indicate whether the amount printed is a total or a sub-total. The driving connection between the total lever 53 and the rack 325 comprises a link 326 (Fig. 11) pivoted at 327 to the plate 115 and at its other end pivoted at a point 328 to an arm 329 loose on the shaft 215. Secured to the arm 329 is a spiral segment 330 meshing with a spiral gear 331 (Fig. 12) fast on a shaft 332 which shaft is identical with the shafts 302 previously described. Fast to the other end of the shaft 332 is a segment 333 (Fig. 16) meshing with teeth 334 formed on the under side of the rack 325. The rack 325 is provided with teeth 311 similar to the teeth on the other racks. These teeth mesh with one of the gears 312 and through one of the sleeves 313 set the type wheel 323 commensurate with the movement of the total lever 53. The rack 325 also has teeth 315 meshing with the lower half of a double segment 316 the upper half of which meshes with teeth 317 formed on the plate 152. Movement of the total lever 53 moves said plate so that the State keys 51 cannot be depressed when the total lever 53 is in the "grand total" position.

The type wheel 323 (Fig. 19) bears the characters "X" and "Z". The "X" represents a sub-total and the "Z" representing a total operation. The type wheel 322 bears two sets of characters "X", "M", "S" and a black star which are identical with the inscriptions on the release keys 52. The type, one wheels 321 have two sets of type from 1 to 9 and the other from 10 to 18 used to designate the various States, that is the State key "Ala." is represented by 1, and "Ga." is represented by No. 10.

The means for setting the two type wheels 324 will now be described. The left hand type wheel 324 (Fig. 19) is secured to the shaft 314 while the right hand type wheel 324 is secured to the innermost sleeve 313. The two gears 312 at the extreme right in Fig. 19 are secured to the innermost sleeve 313 and the shaft 314 and consequently when said gears are moved the type wheels 324 are positioned. These two gears 312 mesh with two racks 337 (Figs. 12, 19, and 32) provided with teeth 338. Each of these racks meshes with a segment 339, (Fig. 31) loose on a stud 340 carried by the frame 140. Secured to the segment 339 by a hub 341 is a segmental member 342. The other rack 337 meshes with teeth formed on a segment 343 (Fig. 32) similar to the segmental member 342. The key 133 is provided with two pins 344 and 345 arranged on the opposite sides of said key (Figs. 33 and 34). When said key is inserted in the slot 135 the pin 344 engages an end 346 of a pawl 347 mounted on the frame 130 and rocks said pawl counter clockwise (Fig. 31) thereby disengaging its lower end 348 from a notch 349 in the member 342. After rocking the pawl 347 the pin 344 then engages a slot 336 in the member 342 and rocks said member counter-clockwise thereby moving the rack 337 to the right (Figs. 16 and 31). The pin 345 (Fig. 33), when the key 133 is inserted in the slot 135, engages the upper end 350 (Fig. 32) of a pawl 351 and rocks said pawl so that its lower end 352 is disengaged from a shoulder 353 formed in the member 343. The member 343 is provided with a slot identically the same as the slot 349 and after the pin has rocked the pawl 341 it engages the slot in the member 343 and rocks said member counter-clockwise thereby moving the other rack 337 to the right (Fig. 31). The position of the pins 344 and 345 is such that the racks 337 are moved a certain distance whereby a number corresponding to said key, in this case 31 (Fig. 34), is set upon the type wheels 324 to print the No. 31. From this description it can be seen that for other cashiers' keys, although there are none other shown in the drawings, when the pins 344 and 345 are positioned differently on said keys from that shown in Figs. 33 and 34, that the racks 337 will be moved different distances according to the position of said pins on the keys thereby setting the type wheels 324 to print the proper cashier's number.

After the amount racks 308 have been positioned by the actuation of the differential actuators as determined by the amount keys 50, and before an impression is taken from the type wheels a mechanism is operated which is for the purpose of preventing the printing of cyphers to the left of the highest denomination represented by a digit other than a cypher and for permitting the printing of cyphers to the right. This mechanism which is known in the art as a "zero elimination mechanism" will not be specifically described herein as this mechanism is identical with that fully illustrated and described in the U. S. Letters Patent, No. 1,311,854, granted to F. L. Fuller, Aug. 5, 1919. This mechanism in general terms comprises hooked levers 356 (Figs. 16 and 29) which co-operate with notches 357 in the upper edges of the racks 308. At the proper time during the operation of the machine these hooked levers 356 are moved into engagement with the notches 357 and said levers given a backward movement through arms 358, 359 and 360, the last mentioned arm having an anti-friction roller 361 projecting into a cam race 362 formed in the disk 363 fast on the printer cam shaft 300. Through this mechanism all of the racks 308 to the left of the rack which has been set to represent the highest digit in the number to be printed are drawn backward to move said racks and the type wheels associated therewith from their normal zero printing position to a non-print position.

After the type wheels (Fig. 19) have been positioned an aligning mechanism is operated to hold said type wheels against movement during the time when several impressions are taken therefrom. This aligning mechanism comprises two arms 365 (Figs. 12 and 16) fast on a shaft 366 carried by the frames 139 and 140. The arms 365 are made integral by a yoke 367. Loose on the shaft 366 and between the arms 365 is a spring pressed aligning pawl 368 having a pin 369 projecting into a hole 370 in the arm 365. The pawl 368 by means to be later described is moved to the right (Fig. 16) so that it will engage the gears 312 to prevent movement thereof and also to prevent movement of the type wheels (Fig. 19). Also fast on the shaft 366 is an arm 371 (Figs. 12 and 16) which has pivoted thereto the upper end of a link 372 the lower end of which is pivoted to a lever 373 (Fig. 18) mounted on a stud 374 carried by the frame 140. The lever 373 is provided with two anti-friction rollers 375 which co-operate with a double plate cam 376 (Figs. 12 and 18) fast on the cam shaft 300. After the type wheels have all been set and during the rotation of the shaft 300 the lever 373 is rocked counter-clockwise (Fig. 18) thereby moving the link 372 to the right in the direction of its length and rocking the shaft 366 and arms 365 counterclockwise thereby allowing the pawl 368 to engage the gears 312 and to be held in such engagement with said gears until after the various impressions have been taken from the type wheels. After the impressions have been taken the double plate cam 376 causes the lever 373 to be rotated clockwise to normal position thereby drawing the link 372 to the left in the direction of its length and rocking the shaft 366 and the arms 365 clockwise whereby the pin 369 is again engaged by the right hand edge of the hole 370 in the arm 365 and moves the aligning pawl 368 clockwise out of engagement with the gears 312 into its normal position.

As before stated the machine shown herein is provided with two detail strips. The upper detail strip 380 is fed from a supply roll 381 (Figs. 13 and 14) mounted on a stud 382 carried by the frame 139, under a stud 383 and between knurled rollers 384 and 385. The roller 384 is loose on a stud 386 carried by the frame 139, and is provided with a hub (Fig. 12) 387 connected by a mortice and tenon to a hub 388 integral with a ratchet 389 loose on the stud 386. The roller 385 is loose on a rod 398 carried by parallel arms 390 (Figs. 12, 13 and 14) loose on a stud 391 mounted in the frame 139. Secured to the center of the stud 391 is a torsion spring wound in two directions, the ends of which engage the rod 398 and hold the roller 385 in engagement with the roller 384. Loose on the stud 386 is an arm 393 (Figs. 12 and 15) having pivoted thereto the upper end of a pitman 394 the lower end of which is bifurcated to surround the shaft 300. The lower end of the pitman 394 carries an anti-friction roller 395 projecting into a cam race 396 (Fig. 24) formed in a disk 397 fast on the shaft 300 (Fig. 15). The arm 393 carries a spring pressed feeding pawl 399 engaging the ratchet 389. The configuration of the cam race 396 (Fig. 24) is such that the pitman 394 is moved first to the right in the direction of its length (Figs. 13 and 15) to rock the arm 393 clockwise, and then moved to the left to normal position whereby the arm 393 is rocked counter-clockwise and the pawl 399 being in engagement with the ratchet 389 causes said ratchet to be rotated counter-clockwise whereby the roller 384 through its hub connection with said ratchet is rotated counter-clockwise to feed the detail strip 380 and position said strip to receive an impression from the type wheels. Co-operating with the ratchet 389 is a spring pressed retaining pawl 400 mounted on a stud 401 carried by the frame 139.

The lower detail strip 405 (Figs. 13 and 14) is fed from a supply roll 406 mounted on a stud 407, carried by the frame 139, under a stud 408, between a shield 409 and a table 410, over a roller 411 and passed down between said roller and a roller 412 and under a plate 413 and exposed on top of a part of the cabinet 414. The roller 411 is fast on a shaft 415 mounted in the frame 139 and a frame 416 which extends across the front of the printing mechanism (Fig. 12). The roller 412 is fast on a shaft 417 mounted in elongated holes 418 in brackets 419 carried by a portion of the cabinet 420 and held in engagement with the roller 411 by compression springs 421 (Fig. 14).

The lower detail strip is constructed to receive only printed totals, and not printed items of a mixed order such as are printed on the upper detail strip. The means for rotating the roller 411 for feeding the lower detail strip comprises a gear 425 (Figs. 14 and 15) fast on the shaft 415. Meshing with the gear 425 is a gear 426 loose on a stud 427 carried by the frame 139. Loose on the stud 427 is a bifurcated arm 429 surrounding a pin 430 on an arm 431 (Figs. 15 and 26) fast on the pitman 432 bifurcated to surround a shaft 433 carried by the frames 139 and 416. The arm 429 is made integral with an arm 434 carrying a spring pressed roller 435 which engages the inner surface of a flange 436 integral with the gear 426. The roller 435 lies in a cut out portion 437 in the arm 434. The pitman 432 carries an anti-friction roller 438 projecting in a cam race 439 formed in a disk 440 fast on the shaft 433. The disk 440 is given one-third of a clockwise rotation by means to be hereinafter described whereby the pitman 432 is moved to the left (Fig. 26) and rocks the arm 429 and consequently the arm 434 clockwise. During this one-third rotation of the disk 440 the race 439 causes the pitman 432 to be moved to the right to normal position thereby rocking the arms 429 and 434 counter-clockwise. The counter-clockwise movement of the arm 434 causes the roller 435 to become wedged between said arm 434 and the flange 436 of the gear 426 whereby said gear is rotated counter-clockwise which rotates the gear 425 clockwise. The gear 425 being secured to the roller 411 said roller is rotated whereby the detail strip 405 is fed after having received an impression from the type on the lower half of the type wheels.

Means is provided for preventing retrograde movement of the gear 426 when the arms 429 and 434 are being rotated clockwise. This means comprises an arm 443 (Fig. 15) which carries a roller 444 like the roller 435. Said roller 444 is so positioned that should the clockwise movement of the arm 434 tend to move the gear 426 clockwise the roller 444 would be wedged between the inner edge of the flange 436 and a formed portion 445 on the arm 443 thereby preventing clockwise movement of the gear 426 during the clockwise movement of the arm 434. However, when the gear 426 is moved counter-clockwise to feed the detail strip the roller 444 is loose between the flange 436 and the portion 445, and therefore it does not prevent movement of the gear 426 to feed the lower detail strip.

Manually operated means is also provided for rotating the roller 411 to feed the lower detail strip out of the machine when it is desired to look at the printing thereon. This means comprises a pinion 446 (Figs. 12 and 13) fast on the outer end of the shaft 415. Meshing with the pinion 446 is another pinion 447 fast on a sleeve 448 loose on a stud 449 carried by the frame 416. Also secured to the sleeve 448 is a knurled knob 441 which may be gripped by the operator and turned counter-clockwise whereby the roller 411 is rotated clockwise to feed the lower detail strip out so that it may be torn off. The edge of the plate 413 is serrated for the purpose of making the paper tear easily. The knob 441 cannot be turned in a clockwise direction for the same reason that the gear 426 is not turned clockwise during the clockwise movement of the arm 434.

In Fig. 20 is illustrated a portion of the upper detail strip after it has been torn off by the operator. In the top row of printing "31" represents the cashier's number, "24.25" represents the amount, "4" represents the State of Calif. and "M" represents that this amount is part of a mixed order. The next three items are also a part of this same mixed order. The next line "70.10" represents the total amount of the mixed order and the "XZ" signifies that "70.10" is the total of the above four items of the mixed order. The next four lines of printing represent record prints of single orders. In the next line "412.99" represents the total amount of all the totalizers and the black star and "Z" signify that this amount is the grand total of all the totalizers. The last line of printing represents the total printed from the Delaware totalizer, the "SZ" signifying that the amount is the State total.

In Fig. 21 is illustrated a portion of the lower detail strip after it has been torn from the machine by the operator. It will be noticed that all of the records on this strip are records of single orders, State totals, mixed totals and grand totals.

As the lower detail strip receives only the impressions of the total amount of orders and also the printed totals during total printing operations means is provided whereby during the registration of a mixed order, or in other words upon depression of the "M" key, the lower detail strip is not fed.

The means for controlling the feeding of the lower detail strip will now be described, in other words the means which causes the disk 440 (Fig. 26) to be given one-third of a rotation each time a key in the release bank is depressed except the "M" key, depression of the "M" key setting up a condition whereby the disk 440 is not operated whereby the lower detail strip is not advanced. Fast on the shaft 1433 is a Geneva plate 443 (Figs. 12 and 25) having six divisions. Co-operating with the plate 1443 is a disk 1444 carrying two pins 1445 which co-operate with notches 1446 in the Geneva plate 1443. The disk 1444 has integral therewith a locking plate 1447 which normally locks the plate 1443. The disk 1444 is mounted on the shaft 300 so that it will slide thereon and yet be rotated by said shaft. By referring to Fig. 12 it will be noticed that the pins 1445 are not in operative alignment with the Geneva plate 1443. However the disk 1444 is arranged to be slid on the shaft 300 by means to be hereinafter described whereby the pins 1445 will be in alignment with the Geneva plate 1443. When this happens the pins 1445 during the rotation of the shaft 300 engage the notches 1446 in the plate 1443 and give said plate one-third of a rotation. The plate 1443 and the disk 440 (Figs. 25 and 26) are fast on the shaft 433 and consequently the shaft and the disk 440 will receive one-third of a rotation for the purpose of feeding the lower detail strip, as previously described.

The means for controlling the sliding of the disk 1444 on the shaft is under the control of the release keys 52. These means comprise a cam 450 (Figs. 16 and 17) secured to the segment 306 which meshes with the rack 308 associated with the release bank of keys 52. Co-operating with the cam 450 is an anti-friction roller 451 carried by a lever 452 loose on one of the shafts 302. Pivoted at the point 453 to the lever 452 is an arm 454 (Figs. 37 and 38) bifurcated at 455 to surround a pin 456 (Fig. 17) carried by an arm 457 fast on a shaft 458. Also fast on the shaft 458 is an arm 459 (Figs. 12, 13 and 14) bifurcated to project into an annular groove 460 in a hub 461 made integral with the disk 1444. Loose on the shaft 458 is a drum cam 462 having a spiral groove 463 into which projects an anti-friction roller 464 carried by a portion 465 of an arm 466 loose on the shaft 458. The arm 466 is kept from turning on the shaft by means of a plate 467 mounted on the frame 416 and fastened to the arm 466 by means of two screws 468 (Fig. 13). The arm 454 carries a pin 469 (Figs. 17 and 37) which co-operates with a hook 470 integral with the lever 471 loose on a rod 472 supported by the frame 140. The lever 471 is provided with a slot 478 into which extends the pin 456 in the arm 457. Secured to the lever 471 is an arm 473.

The arm 473 carries one anti-friction roller 474 and the lever 471 carries another anti-friction roller 475 which co-operate with plates 476 and 477 respectively of a double plate cam fast on the drive shaft 300.

The cam 450 being associated with the rack 308 which in turn is associated with the release bank of keys 52 is adapted to be moved to four different positions other than that shown in Fig. 17, this figure showing the zero position of the cam. In Fig. 17 the parts are all shown in the zero position which however they never occupy between operations of the machine. The arm 457 may be as shown with the pin 456 in its upper position or said arm may be in its other position with the pin 456 in its lower position when the remaining parts of Fig. 17 are standing at zero. The pin 456 may be in the position shown in Fig. 17, or lower in the slot depending upon adjustment of the cam 450. By referring to Fig. 4 it will be seen that the black star key is in the first position, the "S" in the second, and so on. When the rack 308 is moved under the control of these keys the cam 450 is moved a distance commensurate with the operated key in this bank. Just before the cam 450 is positioned the cams 476 and 477 rock the lever 471 and arm 473 clockwise to release the hook 470 from the pin 469. This movement does not move the pin 456 because in Fig. 17 said pin is in its upper position and there is a clearance between the bottom of it and the bottom of slot 478. As before stated the lower detail strip is fed upon depression of all of the keys 52 except the "M" key. When the cam 450 is moved under the control of the black star key so that the roller 451 occupies the position 480 on the periphery of said cam the arm 452 is rocked clockwise thereby raising the point 453 and rocking the arm 454 with the pin 456 as the fulcrum point. Immediately after the cam 450 is positioned under the control of the release keys the cams 476 and 477 cause the arm 473 and lever 471 to be rocked counter-clockwise whereby the hook 470 engages the pin 469 on the arm 454. With the point 453 in the raised position when the hook 470 engages the pin 469 the arm 454 will be rocked counter-clockwise with the point 453 as the fulcrum thereby causing the arm 457 to be rocked clockwise which clockwise movement rocks the shaft 458 and through the spiral race 463 in the drum cam 462 the said shaft is slid towards the frame 416. (Fig. 12). The sliding of the shaft 458 through the arm 459 moves the hub 461 and consequently the disk 1444 towards the frame 416 thereby moving the pins 1445 into operative relation with the Geneva plate 1443. The shaft 458 remains in this position until a subsequent operation of the machine. The pin 456 is now in its lower position. During this subsequent operation, say with the "S" key depressed, the clockwise movement of lever 471 and arm 473, through the slot 478 and pin 456, rocks the arm 457 counter clockwise which shifts the shaft 458 back to the position shown in Fig. 12. This movement of lever 471 and arm 473 disengages hook 470 from pin 469 as above described. When the arm 457 is rocked counter-clockwise as just described the arm 454 pivots about the point 453 but said point remains in the upper position as the roller 451 remains on the high periphery 480 of the cam 450 due to the fact that the cam is set by the beam mechanism and is not returned to zero position. This movement of arm 454 raises the pin 469 and when the lever 471 is rocked clockwise, as above described, the hook 470 moves said pin 469 down and rocks arm 457 clockwise to shift the shaft 458 the same as for the black star key operation and said shaft remains in its forward position at the end of this operation. The high portion 480 on the cam 450 is long enough to take care of the black star key and the "S" key positions, and consequently the lower detail strip will be fed upon depression of either of these two keys. Now assume that the "M" key is depressed the plate 450 will be rocked to its third position whereby the roller 451 will enter a notch 481 in said plate. Before the cam is moved the lever 471 and arm 473 are rocked clockwise, as above described, to disengage hook 470 from pin 469. This movement of said arm and lever rocks arm 457 counter-clockwise as above described. As roller 451 enters the notch 481 the arm 452 rocks counter clockwise and lowers point 453. This lowering of point 453 and raising of pin 456 moves pin 469 to the position shown in Fig. 17. When this has happened and the cams 476 and 477 are rotated to rock the arm 473 and lever 471 counter clockwise the hook 470 engages the pin 469 but there will be no camming action against the pin, and consequently the arm 454 will not be moved, the slot 478 in the lever 471 being long enough to take care of the movement of said lever so that the pin 456 is not moved, and consequently the shaft 458 is not rocked, nor slid towards the frame 416 (Fig. 12). If the shaft is allowed to remain in the position shown in Fig. 12 upon depression of the "M" key it can be readily seen that when the shaft 300 is rotated and rotates the disk 1444 that the pin 1445 will not engage the Geneva plate 1443, and consequently said plate will not be rocked nor will the disk 440 be moved since said disk is only moved when the Geneva plate 1443 is moved as has been previously described. When the "X" key is depressed the cam 450 is moved so that the roller 451 engages a portion of the periphery 482 whereby the lever 452 is rocked to raise the point 453 so that when the hook 470 is operated by the cams 476 and 477 said hook will move the pin 469 and rock the arm 454 counter-clockwise with and rock the arm 454 as a fulcrum therefore rocking the arm 457 through the pin 456 and consequently sliding the shaft 458 whereby the pins 1445 will be moved into operative alignment with the Geneva plate 1443 so that upon continued rotation of the shaft 300 said pins will rock the Geneva plate two spaces whereby the disk 440 will be rotated one-third of a rotation to move the pitman 432 back and forth to feed the lower detail strip.

As previously stated the machine herein disclosed is designed to make a printed record upon an order sheet, a reduced sample of which is illustrated in Fig. 22. The slip is placed upon the table 410 so that an impression will be taken from the lower set of type on the type wheels. Means is provided for feeding the order sheet after each impression of the amount of an item of a mixed order. After the total of said mixed order is printed upon said sheet upon the depression of the "X" key means is operated whereby the sheet is ejected from the machine. These means will now be described, the feeding mechanism being taken up first. After the order sheet is inserted in the machine on the table 410 an impression mechanism, to be hereinafter described, is operated for taking an impression from the lower set of type upon the type wheels (Fig. 14). After the impression has been taken the slip is fed to receive a subsequent impression provided the order being registered in the machine is a mixed order. Fast on a shaft 483, (Figs. 12, 13, 14 and 15) supported at one end in a bracket 484 carried by the frame 416 and at its other end in the frame 139, is an arm 485. Loose on a stud 486 carried by said arm is a knurled roller 487 having fast to the side thereof a ratchet 488. Loose on the stud 486 is an arm 479 (Fig. 13) which has mounted thereon a spring pressed driving pawl 489 which co-operates with the ratchet 488. Pivoted to the arm 479 is one end of a pitman 491 (Figs. 13 and 23) the other end of which is bifurcated to surround the shaft 300. Said pitman carries an anti-friction roller 492 projecting into a cam race 493 formed in a disk 494 fast on the shaft 300. Loose on the shaft 495 and directly above the roller 487 is a knurled roller 496 (Figs. 12 and 13). Fig. 12 shows a top plan view of the roller 496. Directly under it is its cooperating roller 487. It can be seen from this figure that these rollers are narrow and are located nearer the front of the machine than rollers 411 and 412, which feed the lower strip. As the inserted order slip is wider than said lower detail strip the rollers 496 and 487 will grip the inserted order slip but are not wide enough to come into contact with the detail strip. It is therefore apparent that the means for feeding the lower detail strip and the inserted order slip are entirely independent of each other.

By means to be hereinafter described the roller 487 is moved into contact with the roller 496 thereby gripping the order sheet between said rollers. The cam race 493 (Fig. 23) upon rotation of the shaft 300 moves the pitman 491 first to the left (Fig. 13) and then to the right to normal position. The movement of said pitman to the left rocks the arm 479 clockwise and carries the pawl 489 with it and upon counter-clockwise movement of said arm 479 to normal position said pawl engages in the next tooth of the ratchet 488 and rotates said ratchet counter-clockwise and consequently the roller 487 in the same direction thereby feeding the order sheet to the left (Fig. 13) so that it is positioned to receive the next impression. The arm 485 carries a spring pressed retaining pawl 490 which prevents retrograde movement of the roller 487. The means for causing the two rollers 496 and 487 to be engaged to feed the order sheet comprises a bell crank 500 fast on the shaft 483. The lower arm of the bell crank carries a pin 501 which co-operates with the periphery of a segmental member 502 fast on a shaft 503 (Figs. 12, 13, 14, 15 and 16). The pin 501 is held in engagement with the periphery of the member 502 by a spring 504 stretched between the upper arm of the bell crank 500 and a pin carried by the pitman 394. Also fast upon the shaft 503 is a segment 505 meshing with teeth 506 formed on the upper side of the rack 308 associated with the release bank of keys 52. Upon depression of the "M" key the rack 308 is moved to the right (Figs. 15 and 16) thereby rocking the segment 505 and the member 502 counter-clockwise until the pin 501 is opposite a notch 507 in the periphery of the member 502 whereupon under the influence of the spring 504 said pin engages said notch to allow the shaft 483 to be rocked counter-clockwise thereby rocking the arm 485 counter-clockwise whereupon the roller 487 engages the roller 496 after which the roller 487 is operated as above described to feed the order sheet. Upon depression of any of the other keys 52 in the release bank the pin 501 remains in engagement with the outer periphery of the member 502 thereby preventing the shaft 483 and consequently the arm 485 from being rocked counter-clockwise. Consequently the roller 487 is not engaged with the roller 496 upon the depression of the "X", "S" or the black star key. When the roller 487 is not engaged with the roller 496 it is rotated by the pitman 491 in identically the same manner as when it is engaged only that its movement is idle. With the order sheet in the machine to receive the impression of the next order it is fed as just described after the impression of the amount of each individual item. After the items have all been listed upon said sheet the "X" key is depressed whereupon the slip is ejected from the machine.

The means for ejecting the slip from the machine will now be described and comprises, two knurled rollers 509 and 510 (Figs. 12 and 13). The roller 509 is loosely mounted on a casting 511 (Figs. 12, 13 and 26) and tends to rock clockwise due to a compression spring 512. The hub of the casting 511 is provided with a notch 513 within which projects a pin 514 driven into the shaft 495. This pin prevents the casting 511 from rocking clockwise farther than shown in Fig. 13 except when the machine is operated under certain conditions. Fast on the shaft 495 is an arm 515 pivoted to an upper extension 516 integral with the pitman 432 previously described. It will be remembered that the pitman 432 is moved first to the left and then to the right (Fig. 26) to feed the lower detail strip. The movement of said pitman to the left rocks the arm 515 and shaft 495 clockwise whereby the casting 511 under the influence of the spring 512 is rocked clockwise so that the roller 509 engages the roller 510. Continued clockwise movement of the arm and pin provides clearance between the rear end of the slot and pin thus placing the tension roller under control of the spring. The roller 510 is fast on a shaft 517 (Figs. 12 and 13) mounted in brackets 518 secured to the frame 416. Fast upon the left hand end of the shaft 517 is a spiral pinion 519 meshing with a spiral pinion 520 loose on the shaft 433. Secured to the spiral pinion 520 by means of a hub is a pinion 521 (Figs. 12 and 13) which meshes with a gear 522 loose on the shaft 300. Secured to the side of the gear 522 is a pinion 523 meshing with a gear 524 loose on the shaft 433. Fast to the gear 524 is a Geneva plate 525 (Figs. 12 and 30). Integral with the hub 461 and the disk 1444 (Fig. 12) is a disk 526 (Figs. 12 and 30) carrying a pin 527 which cooperates with slots 528 in the Geneva plate 525. Secured to the side of the disk 526 is a plate 529 which normally engages one of the locking surfaces 530 of the Geneva plate 525.

By referring to Fig. 12 it can be seen that the pin 527 is not in operative alignment with the Geneva plate 525. However, from a previous description it will be remembered that the hub 461 is shifted towards the frame 416 (Fig. 12) upon depression of the "X," "S" and the black star keys but is not shifted upon depression of the "M" key. The shifting of the hub 461 positions the pin 527 so that it will actuate the Geneva plate 525 whereupon said plate and the gear 524 are rotated clockwise thereby rotating the pinion 523 and the gear 522 counter-clockwise. The gear 522 rotates the pinion 521 and the spiral pinion 520 clockwise whereby the spiral pinion 519 is rotated in the proper direction to cause rotation of the roller 510 so that when the roller 509 is engaged therewith the order sheet will be ejected from the machine. Attention is called to the fact that the roller 509 is only engaged with the roller 510 upon depression of the "X," "S" or the black star keys, and consequently whenever said rollers are engaged the disk 526 is slid towards the frame 416 so that the Geneva plate 525 will be actuated to rotate the train of gears above described to actuate the spiral pinion 519 so that said rollers may be operated to eject the slip.

A sample order sheet is shown in Fig. 22 and illustrates the printing thereon made from the type line when a mixed order is received. The first four items representing the individual items of the mixed order, the last item representing a total of said order, "XZ" indicating that this amount is a total and also that said totalizer was turned to zero after the type were set to cause this impression.

The upper and lower detail strips, the order sheet and the printing thereupon having been described the mechanism for taking these impressions from the type wheels will now be described. The upper impressions will be taken up first.

The means for taking an impression from the upper set of type on the type wheels 320 to 324 inclusive, comprises a resilient platen 535 (Figs. 13 and 14) carried by a U shaped bar 536 mounted in a block 537 integral with parallel arms 538 formed on a casting 539 loose on a shaft 540. Secured to the casting 539 is an arm 541 (Figs. 13, 14 and 15) having pivoted thereto the upper end of a link 542 the lower end of which is pivoted to an arm 543 loose on a rod 544 carried by the frames 139 and 416. Also loose on the rod 544 and secured to the arm 543 are two arms 545 and 546 (Figs. 12, 15 and 28). The arms 545 and 546 are also connected by a pin 579, to prevent relative movement between the arms. Mounted on each arm 545 and 546 is an anti-friction roller 547 and 548 which co-operate with plates 549 and 550 of the double-plate cam loose on the shaft 433. Secured to said double plate cam is a Geneva plate 551 held in normal position by a plate 552 engaging one of the locking surfaces 553 of said Geneva plate 551. Fast to the plate 552 is a disk 554 carrying a pin 555 which co-operates with notches 556 in the Geneva plate 551. The disk 554 is fast on the shaft 300.

Counter-clockwise rotation of the shaft 300 (Fig. 28) rotates the disk 554 likewise whereby the pin 555 engages the notch 556 and rotates the Geneva plate 551 and consequently the cams 549 and 550 in the same direction. This movement through the rollers 547 and 548 rocks the arms 545 and 546 and consequently the arm 543 in a clockwise direction thereby lowering the link 542 (Figs. 14 and 15) whereupon the arm 541 is rocked clockwise. This movement of the arm 541 causes the platen 535 to engage the type wheels 320 to 324 to take an impression therefrom upon the upper detail strip. The disk 554 is not slidable on the shaft 300 but is secured to said shaft and therefore it can be seen that when said shaft is rotated, which is once during every operation of the machine, that the upper impression mechanism, just described will always be operated to make an impression upon the upper strip. This causes the individual amounts of mixed orders to be printed upon said strip and also total amounts whenever the machine is operated to take a total from any of the totalizers.

Means is provided for taking an impression from the lower set of type on the type wheels 320 to 324 inclusive, upon the lower detail strip and also upon the order sheet. The impressions upon the order sheet include all of the individual items of a mixed order and the total of said order while the impressions upon the lower detail strip are only made when an order is received containing but one item and upon total printing operations, as has been previously stated. The means for taking an impression from the lower set of type comprises, a resilient platen 557 (Fig. 14) secured in a U shaped bar 558 carried by a block 559 integral with parallel arms 560 (only one of which is shown). Said arms are loose upon the shaft 544 and are connected by a T shaped rod 561. The block 559 has pivoted thereto the upper end of a link 562, the lower end of which is pivoted at 563 to a link 564, and the other end of which is pivoted at 565 to a lever 566 loose on the shaft 544. The links 562 and 564 form a toggle and are held in normal position by a spring 567, stretched between the point 563 and a pin carried by the lever 566. In the normal position of this toggle, the upper end of the lower link 564 s in contact with an adjustable pivoted member 568. This member is pivoted at the point 576 to the lever 566 and carries in its lower end a screw 577 cooperating with a slot 578 provided in the lever for adjusting the position of the pivoted member. The upper end of said member is formed so as to break the toggle various degrees by adjusting the pivoted member in a clockwise direction. By providing this toggle connection between the lever and the impression platen, the printing impression will be uniform regardless of the thickness of paper used. The left hand end of the lever 566 is provided with two arms 569 and 570 (Figs. 14 and 27) carrying antifriction rollers 571 and 572 respectively, which cooperate with plates 573 and 574 of a double plate cam loose on the shaft 433. Fast to the plate cams 573 and 574 by means of a hub is a Geneva plate 575. Fast on the hub 461 (Fig. 12) is a disk 580 (Figs. 12, 14 and 27) carrying a long pin 581 and a short pin 582.

Upon operation of the machine when the "M" key is depressed it will be remembered that the hub 461 is not slid on the shaft 300, however, the pin 581 (Figs. 12 and 27) is long enough to engage one of the notches 583 in the Geneva plate 575 and consequently said plate will be rotated clockwise thereby rotating the cams 573 and 574 clockwise whereby the lever 566 is rocked first counter-clockwise and then clockwise. The counter-clockwise movement of said lever through the links 562 and 564 rocks the arms 560 a distance sufficient to permit the platen 557 to engage the lower side of the type wheels 520 to 524 whereby an impression is taken upon the order sheet. When the "X" key is depressed and the hub 461 is slid towards the frame 416 the disk 580 is consequently slid therewith whereby the pin 582 is moved into operative alignment with the Geneva plate 575 thereby causing said Geneva plate to receive one clockwise oscillation from the pin 581 and another clockwise oscillation from the pin 582 and consequently the lever 566 will be rocked counter-clockwise and then clockwise twice so that two impressions will be made by the platen 557. The first impression is the total of the mixed order upon the order sheet and the second impression is taken upon the lower detail strip. After the impression upon the order sheet the said order sheet is immediately ejected from the machine, as previously described. In totalizing operations upon a depression of the "S" or the black star key the hub 461 is slid, as previously described, and two impressions will be made from the lower impression platen 557.

The means for inking the type wheels comprises, an endless ribbon 587 (Figs. 13, 14 and 15) which is passed between two felt ink rolls 588 and 589, over two guards 590 around a roller 591 and passed outward underneath a stud 592. The roller 588 is loose on a rod 593 and has secured to the end thereof a ratchet 594. Co-operating with said ratchet is a spring pressed driving pawl 595 and a spring pressed retaining pawl 596. The driving pawl 595 is pivoted upon a lever 597 bifurcated to surround a stud 598 carried by the pitman 394. The ink roller 589 is loose on a stud 599 carried by parallel arms 600 mounted on a rod 601.

Said roller 589 is held in engagement with the ribbon 587 and the roller 588 by means of a spring 602.

From a previous description it will be remembered that the pitman 394 is moved first to the right to feed the upper detail strip, and then to the left to normal position. The first movement of said pitman rocks the lever 597 clockwise thereby causing the pawl 595 to rotate the ratchet 594 and consequently the roll 588 in a clockwise direction thereby advancing the ribbon for each operation of the machine.

Operation.

An operation of the machine will now be described. Assuming that a mixed order has been received by a mail order house written on an order sheet substantially the same as the illustration in Fig. 22. The cashier first inserts the cashier's key 133, the insertion of which through the pins 344 and 345 positions the racks 337 to set up the type wheels 324 to print the cashier's number which in this case is 31. The total lever 53 must also be in the "Add" position so that the slots 153 of plate 152, which said lever controls, will register with the arms 78 of the State key banks and the arm 109 of the release key bank. After this has been done the operator depresses the amount keys 50 (Fig. 1) representing the amount 24.25 and then depresses the Calif. key which is the State from which the order is received and finally depresses the "M" key to release the machine. Upon operation of the machine the left hand or back totalizer (Fig. 1) is shifted to the sixth position which selects the Calif. State totalizer, the upper totalizer line is left in the zero position and the front totalizer line is shifted to the third position whereby the amount 24.25 through the actuation of the differential mechanism shown in Fig. 1 accumulates said amount upon a totalizer in all three of said totalizer lines. The type wheels 320 (Fig. 19) are set through the actuation of said differential mechanism whereby the amount is printed upon the upper detail strip and the order sheet which has been inserted in the machine before the operation thereof. The "M" key having been depressed the hub 461 (Fig. 12) is not shifted therefore and only one impression will be taken from the lower impression platen 557, this impression being made as just stated upon the order sheet.

After the impression upon said order sheet from the lower platen 557 and upon the upper detail strip from the upper platen 535 said order sheet and said detail strip are advanced to receive the second impression. The cashier next depresses the amount of the second item and then the "Calif." key and then the "M" key and the operation of the machine performs the same function as just described. This is done for the "$5.00" item and also for the "$23.10" item. After the four items have been set up in the machine the cashier depresses the "Calif." State key and then moves the total lever 53 counter-clockwise (Figs. 8 and 11) to position it opposite the inscription "Ala. to Fla. X totals" (Fig. 4). After moving the total lever 53 to this position the "X" key is depressed to release the machine. The total lever in this position causes the upper totalizer line (Fig. 1) to be rocked into engagement with the differential mechanism at the proper time whereby said totalizer is reversely rotated to zero thereby setting up the total of the four individual amounts which equals $70.10 on the type wheels 320. This amount is then printed upon the upper detail strip and the order sheet after which said order sheet is ejected from the machine and the lower impression platen 557 is operated a second time to print the total amount $70.10 upon the lower detail strip. After this amount an "XZ" is printed which designates that it is the total of a mixed order, the "Z" indicating that the totalizer which accumulated only the mixed order is reset to zero position.

The individual amounts of this mixed order are accumulated upon the grand totalizer which is on the front totalizer line (Fig. 1).

When it is desired to take a total of any particular State the total lever 53 is moved either clockwise or counter-clockwise to the inscription "State totals" opposite the desired State after which the key representing the State is depressed and then the "S" key is depressed and the machine operated as before. This causes the respective State totalizer to be rocked into engagement at the proper time with the differential mechanism whereby said totalizer, if the total lever 53 is moved counter-clockwise, is reset to zero and the amount printed upon the detail strips, but if the total lever is moved clockwise the amount will be placed back upon said totalizer after it is printed. When the totalizer is moved counter-clockwise the operation is called a "reset" operation and when said total lever is moved clockwise the operation is called a "read" operation.

In order to take the total from the grand totalizer the operator first moves the total lever 53 opposite the inscription "Grand total" and then depresses the black star key and operates the machine whereupon the grand totalizer line, which is the front totalizer line (Fig. 1), is rocked into engagement with the differential actuators whereby the amount upon said totalizer is transferred to the type wheels 320 so that the impression platens may take the impression therefrom upon the upper and lower detail strips.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of type carriers for printing items and totals on an inserted sheet, impression means co-operating therewith, means for feeding said sheet between impressions when a plurality of items are printed, and means for ejecting said sheet when the total of said items has been printed thereon.

2. In a machine of the class described, the combination of a totalizer for accumulating items of a transaction, a printing mechanism, manipulative means for controlling the machine to accumulate items of a transaction and to print them on inserted material, means for feeding said material between such item impressions, and a manipulative means for controlling the machine to prevent accumulation of single item tractions and for rendering said feeding means inoperative.

3. In a machine of the class described, the combination of type carriers for printing items and totals on inserted record material, impression means co-operating therewith, means for feeding said record material between impressions when a plurality of items are printed, means for rendering said feeding means ineffective when only a single item is to be printed, and means for ejecting the record material when only a single item is printed thereon.

4. In a machine of the class described, the combination of type carriers for printing items and totals on inserted record material, impression means co-operating therewith, normally disengaged feeding means for said record material, normally disengaged ejecting means for said record material, means for engaging said feeding means to feed the record material when printing items, means for disengaging said feeding means when the total of said items is to be printed, and means for engaging said ejecting means to eject the record material after printing thereon the total of said items.

5. In a machine of the class described, the combination of type carriers for printing items and totals on inserted record material, impression means co-operating therewith, feeding means for said record material, normally in disengaged position to permit free insertion of said record material, and means for preventing the engaging of said feeding means when only a single item is to be printed.

6. In a machine of the class described, the combination of type carriers for printing items and totals on inserted record material, impression means co-operating therewith, normally disengaged feeding means for said record material, normally disengaged ejecting means for said record material, means for preventing the engaging of said feeding means and for causing said ejecting means to be engaged to eject the record material when only a single item is to be printed thereon.

7. In a machine of the class described, the combination of a main operating mechanism, type carriers for printing items and totals on inserted record material, impression means co-operating therewith, normally disengaged feeding mechanism for the record material, means for engaging said feeding mechanism for feeding the record material after each item is printed, normally disengaged ejecting mechanism for the record material, an auxiliary operating mechanism normally disconnected from the main operating mechanism, and means for disengaging the feeding mechanism and connecting the main operating mechanism to the auxiliary operating mechanism to engage the ejecting mechanism to eject the record material after the total of the items has been printed.

8. In a machine of the class described, the combination of a main operating mechanism, type carriers for printing items and totals on inserted record material, impression means co-operating therewith, normally disengaged feeding mechanism for the record material, normally disengaged ejecting mechanism for the record material, an auxiliary operating mechanism normally disconnected from the main operating mechanism, and means for preventing the engaging of the feeding mechanism and for operatively connecting the main operating mechanism to the auxiliary operation to engage the ejecting mechanism to eject the record material when only a single item is to be printed.

9. In a machine of the class described, the combination of a main operating mechanism, type carriers for printing items and totals on inserted record material, impression means co-operating therewith, normally disengaged feeding mechanism for the record material, normally disengaged ejecting mechanism for the record material operated when the main operating mechanism and the auxiliary operating mechanism are connected, and means for engaging the feeding mechanism to feed the record material and for preventing the connection of the main operating mechanism and the auxiliary operating mechanism.

10. In a machine of the class described, the combination of a main operating mechanism, type carriers having two sets of type, the upper set adapted to print items and a total of said items on record receiving material and the lower set adapted to print items and a total of said items on a second record receiving material and to print totals or a single item on a third record receiving material, an impression mechanism co-operating with the first record receiving material, an impression mechanism common to the second and third record receiving materials, means for operating the last mentioned impression mechanism once for each item when printing items on the second record receiving material, and means for operating said last mentioned impression mechanism twice when only a single item is to be printed, once for the second record receiving material and once for the third record receiving material.

11. In a machine of the class described, the combination of a main operating mechanism, type carriers having two sets of type the upper set adapted to print items and a total of said items on record receiving material and the lower set adapted to print items and a total of said items on a second record receiving material and to print totals or a single item on a third record receiving material, an impression means co-operating with the first record receiving material, an impression means common to the second and third record receiving materials, feeding mechanism for the first record receiving material, feeding mechanism for the second record receiving material, feedign mechanism for the third record receiving material, ejecting mechanism for the second record receiving material, means for operating the last mentioned impression mechanism once for each item and for operating the second mentioned feeding mechanism when a plurality of items are to be printed on the second record receiving material, and means for operating the feeding mechanism for the third record receiving material and the ejecting mechanism for the second record receiving material and for preventing the operation of the feeding mechanism for the second record receiving material.

12. In a machine of the class described, the combination of manipulative devices, a main operating mechanism, type carriers for printing items and totals on inserted record material, impression means co-operating therewith, normally disengaged feeding mechanism for the record material, means controlled by a certain one of said devices for engaging said feeding mechanism, normally disengaged ejecting mechanism for said record material, an auxiliary operating mechanism normally disconnected from the main operating mechanism, and means controlled by any of the other devices for disengaging the feeding mechanism and connecting the main operating mechanism to the auxiliary operating mechanism to render the ejecting means operative.

13. In a machine of the class described, the combination of manipulative devices, a main operating mechanism, type carriers for printing items and totals on inserted record material, impression means co-operating therewith, normally disengaged feeding mechanism for the record material, normally disengaged ejecting mechanism for the record material and operated when the main operating mechanism and the auxiliary operating mechanism are connected, and means controlled by certain of said devices for engaging the feeding mechanism and preventing the connection of the main operating mechanism to the auxiliary operating mechanism.

14. In a machine of the class described, the combination of manipulative devices, type carriers for printing items and totals on inserted record material, impression means co-operating therewith, means for feeding said record material when a certain one of said devices is operated, and record material ejecting means, effective when any one of the remaining devices is operated.

15. In a machine of the class described, the combination of manipulative devices, type carriers for printing items and totals on inserted record material, impression means co-operating therewith, means for feeding said record material when a certain one of said devices is operated, and means for rendering said feeding means ineffective when any one of the remaining devices is operated.

16. In a machine of the class described, the combination of manipulative devices, type carriers for printing items and totals on inserted record material, impression means co-operating therewith, means for feeding said record material when a certain one of said devices is operated, means for rendering said feeding means ineffective when any one of the remaining devices is operated, and record material ejecting means, effective upon the operation of any of said remaining devices.

17. In a machine of the class described, the combination of manipulative devices, type carriers for printing items and totals on inserted record material, impression means co-operating therewith, normally disengaged feeding means for said record material, normally disengaged ejecting means for said record material, means controlled by one of said devices for engaging said feeding means when printing items, and means for disengaging said feeding means upon operation of any of the remaining devices, said record material ejecting means adapted to be engaged upon the operation of any of said remaining devices.

18. In a machine of the class described, the combination of manipulative devices, type carriers for printing items and totals upon inserted record material, impression means co-operating therewith, feeding means for said record material normally in disengaged position to permit free insertion of said record material, and means for preventing the engagement of said feeding means upon operation of certain of said devices.

19. In a machine of the class described, the combination of manipulative devices, type carriers for printing items and totals on inserted record material, impression means co-operating therewith, normally disengaged feeding means for said record material, normally disengaged ejecting means for said record material, means for preventing the engagement of said feeding means upon the operation of certain of said devices, and means for engaging said ejecting means upon operation of said certain device.

20. In a machine of the class described, the combination of manipulative devices, type carriers for printing on inserted record material impression means co-operating therewith, normally disengaged feeding means, normally disengaged ejecting means and means co-operating with said feeding means and said ejecting means for rendering the feeding means operative and causing the ejecting means to remain inoperative, said co-operating means being controlled by said manipulative devices.

21. In a machine of the class described, the combination of manipulative devices, type carriers for printing on inserted record material, impression means co-operating therewith, normally disengaged feeding means, normally disengaged ejecting means, and means co-operating with said feeding means and said ejecting means for causing the feeding means to remain inoperative and rendering the ejecting means operative, said co-operating means being controlled by said manipulative devices.

22. In a machine of the class described, the combination of a main operating mechanism, manipulative devices, type carriers adapted to print on inserted record material and also other record material, impression mechanism co-operating therewith, normally disengaged feeding means for said inserted record material, normally disengaged ejecting means for said record material, and means adapted to be moved differentially under the control of said manipulative devices, said means when controlled by a certain one of said devices causes the first mentioned feeding means to be engaged and operated and causes the ejecting means and the second feeding means to remain operative; and when controlled by other of said devices causes the first mentioned means to remain disengaged and causes the ejecting means to be engaged and operated and simultaneously renders the second feeding means operative.

23. In a machine of the class described, the combination of type carriers, an insertible key, differentially positioned lugs carried on opposite sides of said key, and means operated by said lugs upon an insertion of said key to move the type carriers differentially.

24. In a machine of the class described, the combination of a plurality of type carriers, an insertible key, a limiting stop on said key, a plurality of type carrier controlling means differentially spaced from said stop, slidable members connected to the type carriers, and means connected to said members and operated by said type carriers controlling means upon an insertion of said key to slide said members for positioning the type carriers.

25. In a machine of the class described, the combination of type carriers, an insertible key, slidable members connected to the type carriers, means connected to said members for sliding them to position the type carriers, and a locking member co-operating with said means and operated by an insertion of the key to release said means whereby said means is operated by the insertion of the key.

26. In a machine of the class described, the combination of a plurality of type carriers adapted to be positioned differentially and independently of each other, a removable key, and means interposed between said key and said type carriers and operated by said key upon its removal to move the type carriers to normal position.

27. In a machine of the class described, the combination of type carriers, a removable key, slidable members connected to the type carriers, and means interposed between said members and said key and operated by said key upon its removal to slide said members to move the type carriers to normal position.

28. In a machine of the class described, the combination of type carriers, a removable key, slidable members connected to the type carriers, means interposed between said members and said key and operated by a removal of the key to slide said members to move the type carriers to normal position, and a locking member co-operating with said means and operated by a removal of said key to lock said means when the key is removed.

29. In a machine of the class described, the combination of type carriers, an insertible key, slidable members connected to the type carriers, rockable members connected to said slidable members, and means carried by said key for engaging said rockable members and rocking them thereby to position the type carriers upon insertion of said key.

30. In a machine of the class described, the combination of type carriers, an insertible key, slidable members connected to the type carriers, rockable members connected to said slidable members, means for locking said rockable members, and means carried by said key for unlocking the rockable members and rocking them thereby to position the type carriers upon insertion of said key.

31. In a machine of the class described, the combination of rotatable disks bearing type on their peripheries for printing items and the totals thereof on an inserted slip, a resilient platen cooperating therewith to take an impression therefrom, a pair of knurled rollers for feeding said inserted slip after each item is printed, and another pair of knurled rollers for ejecting the slip when the total of said items has been printed.

32. In a machine of the class described, the combination of rotatable disks bearing type on their peripheries for printing items and the totals thereof on an inserted slip, a resilient platen cooperating therewith to take an impression therefrom, and a pair of knurled rollers for feeding said inserted slip between impressions when a plurality of items are printed, one of said rollers being adapted to be rocked out of engagement with the other of said rollers when only a single item is to be printed.

33. In a machine of the class described, the combination of rotatable disks bearing type on their peripheries for printing items and the totals thereof on an inserted slip, a resilient platen cooperating therewith to take an impression therefrom, a pair of knurled rollers for feeding said inserted slip between impressions when a plurality of items are printed, one of said rollers being adapted to be rocked out of engagement with the other of said rollers when only a single item is to be printed, and another pair of knurled rollers which cooperate to eject said inserted slip when only a single item is printed thereon.

34. In a machine of the class described, the combination of depressible keys, type wheels for printing items and totals on an inserted slip, a resilient platen for taking an impression from the type wheels on said slip, knurled rollers for feeding said slip when a certain one of said keys is depressed, and another pair of knurled rolers for ejecting said slip when any one of the remaining keys is depressed.

35. In a machine of the class described, the combination of depressible keys, type wheels for printing items and totals on an inserted slip, a resilient platen cooperating with said type wheels to take an impression on said inserted slip, knurled rollers for feeding said inserted slip when a certain one of said keys is depressed, and means for moving said knurled rollers out of their mutually cooperative condition when any one of the remaining keys is depressed.

36. In a machine of the class described, the combination of depressible keys, type wheels for printing items and totals on an inserted slip, a resilient platen cooperating with said type wheels to take an impression on said inserted slip, knurled rollers for feeding said inserted slip when a certain one of said keys is depressed, means for moving said knurled rollers out of their mutually cooperative condition when any one of the remaining keys is depressed, and another pair of knurled rollers for ejecting said inserted slip when any of said remaining keys are depressed.

37. In a printing mechanism operable to record items, a normally ineffective means for feeding record material, and means operable as items are recorded for rendering the feeding means effective.

38. In a printing mechanism operable to record items and totals of items, a normally ineffective means for feeding record material, and means operable as items are recorded for rendering the feeding means effective and operable as totals of items are recorded for rendering the feeding means ineffective.

39. In a printing mechanism operable to record items and totals of items on an inserted slip, normally ineffective feeding means adapted to be brought into and moved out of cooperative relation with said slip, manipulative means for controlling the printing mechanism to record items and for rendering the feeding means effective, and other manipulative means for controlling the printing mechanism to record totals of said items and for rendering the feeding means ineffective.

40. In a printing mechanism for printing items, and sub-totals and totals of items on an inserted slip, means for gripping and feeding the slip during the entry of items, and means for controlling said gripping and feeding means to release the slip during sub-total and total printing operations.

In testimony whereof I affix my signature.

BERNIS M. SHIPLEY.

CERTIFICATE OF CORRECTION.

Patent No. 1,626,880.                                    Granted May 3, 1927, to

BERNIS M. SHIPLEY.

It is hereby certified that error appears in the printed specification of the above numbered patent requiring correction as follows: Page 16, line 74, for "1433" read "433"; same line, for "443" read "1443"; page 17, line 14, commencing with the article "The" strike out all to and including the word "zero", line 19; page 21, line 54, strike out the word "and" and insert the same to follow after the word "shifted" in line 53; page 22, lines 32 and 33, claim 2, for the word "tractions" read "transactions"; page 23, line 36, claim 11, for the misspelled word "feedign" read "feeding"; and that the said Letters Patent should be read with these corrections therein that the same may conform to the record of the case in the Patent Office.

Signed and sealed this 12th day of July, A. D. 1927.

Seal.                                                                  M. J. Moore,
                                                                     Acting Commissioner of Patents.